United States Patent [19]
Hicks

[11] Patent Number: 5,412,902
[45] Date of Patent: * May 9, 1995

[54] FISHING FLOAT METHOD AND APPARATUS

[76] Inventor: Thomas W. Hicks, P.O. Box 28234, Atlanta, Ga. 30358-0234

[*] Notice: The portion of the term of this patent subsequent to Jul. 14, 2009 has been disclaimed.

[21] Appl. No.: 39,877

[22] Filed: Mar. 30, 1993

Related U.S. Application Data

[63] Continuation-in-part of Ser. No. 885,311, May 18, 1992, abandoned, which is a continuation of Ser. No. 619,234, Nov. 28, 1990, Pat. No. 5,129,178.

[51] Int. Cl.$^6$ ............................................. A01K 91/00
[52] U.S. Cl. .................... 43/44.87; 43/44.92; 43/44.93; 43/44.94; 43/44.95
[58] Field of Search ............... 43/44.87, 44.9, 44.92, 43/44.94, 44.95, 42.22, 42.31

[56] References Cited

U.S. PATENT DOCUMENTS

| | | | |
|---|---|---|---|
| 943,450 | 12/1909 | Owens | 43/44.94 |
| 1,157,517 | 10/1915 | Easlick | 43/44.95 |
| 2,067,165 | 1/1937 | Albiser | 43/44.94 |
| 2,181,458 | 11/1939 | La Gue | 43/44.95 |
| 2,772,504 | 12/1956 | Zerante | 43/44.95 |
| 2,802,294 | 8/1957 | Litwin | 43/42.22 |
| 2,842,886 | 7/1958 | Williams | 43/44.87 |
| 3,011,285 | 12/1961 | Musser | 43/44.87 |
| 3,303,598 | 2/1967 | Spindler | 43/44.9 |
| 3,468,053 | 9/1969 | Lux | 43/42.31 |
| 3,977,115 | 8/1976 | Check | 43/43.11 |
| 4,483,091 | 11/1984 | Norlin | 43/42.31 |
| 4,561,205 | 12/1985 | Kessler | 43/44.87 |
| 5,129,178 | 7/1992 | Hicks | 43/44.87 |

FOREIGN PATENT DOCUMENTS

| | | | |
|---|---|---|---|
| 0723782 | 10/1931 | France | 43/44.92 |
| 1540909 | 10/1968 | France | 43/44.93 |

OTHER PUBLICATIONS

6 Specimen of fishing floats as represented by photograph commercially available prior to Nov. 28, 1989.
Hicks, Inc. catalog pages showing fishing floats commercially available prior to Nov. 28, 1989.
Buckeye Sports Supply Catalog pp. 152–161, which show fishing floats Hicks, Inc. Catalog pp. 103–111, which show fishing floats.

*Primary Examiner*—Kurt Rowan
*Attorney, Agent, or Firm*—Louis T. Isaf; James A. Witherspoon

[57] ABSTRACT

A tubular fishing float which, in the preferred embodiments, includes at least one extended tubular center section and two end sections which seal the center section to form an air-tight compartment which provides buoyancy. The end sections include devices for attaching the fishing line to the fishing float and, in some embodiments, for providing drag on the fishing line; such devices include one or more circular snap-ins, holes, twists, bends, funnelled holes, resilient ribs, or folds. Also provided are tubular fishing floats with reinforced end sections; baffled tubular fishing floats; baffled tubular fishing floats with spin-welded ends; resilient tubular fishing floats with slits that facilitate quick attachment to a fishing line; tubular fishing floats with pellets therein, for making noise and attracting fish; and tapered tubular fishing floats. Also provided are various devices and methods, including a fully automated method, for fabricating tubular fishing floats.

12 Claims, 22 Drawing Sheets

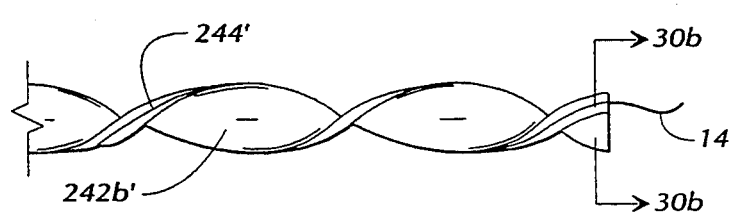
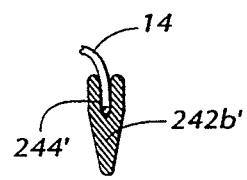
FIG. 30a  FIG. 30b
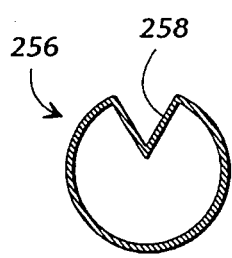
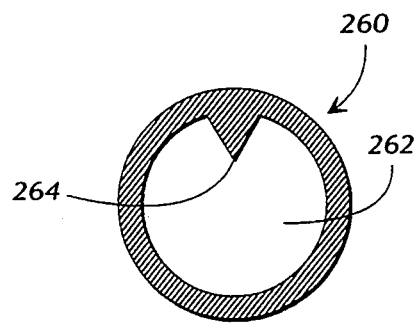
FIG. 31a  FIG. 31b
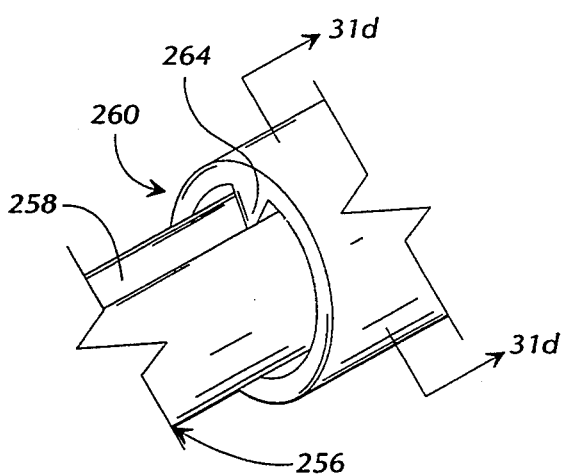
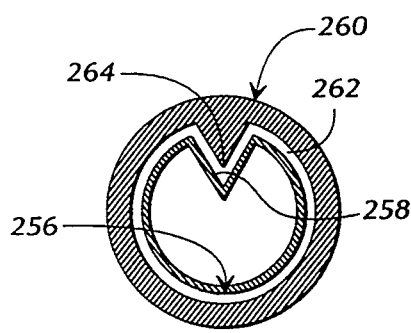
FIG. 31c  FIG. 31d

FISHING FLOAT METHOD AND APPARATUS

CROSS-REFERENCES TO RELATED APPLICATIONS

This application is a continuation-in-part of application Ser. No. 07/885,311, now abandoned filed May 18, 1992, which is a continuation of application Ser. No. 07/619,234 filed Nov. 28, 1990, allowed Jan. 28, 1992, and issued on Jul. 14, 1992, as Pat. No. 5,129,178.

BACKGROUND OF THE INVENTION

The present invention relates generally to the field of fishing equipment, and more specifically, to the field of fishing floats attachable to fishing lines.

Fishing floats have been used by fisherman for many years. Fishing floats are most often used to suspend live bait between the top of the water and the water bottom, making the bait more attractive to certain types of fish. Because water depths are not constant and fisherman customarily fish in various locations, fishing floats which are not easily moved to different positions along a fishing line are inconvenient to use.

One very common type of fishing float currently used by fisherman is constructed of plastic in the form of an air-tight sphere with a small retractable cylinder attached. This type of fishing float is often painted red and white. The cylinder is spring loaded and cooperates with a wire to enable the fisherman to attach the fishing line to the top and bottom of the fishing float. If this type of fishing float is dropped onto a very hard surface, it tends to break and is no longer air-tight. Also, the wire and spring may rust after prolonged usage. Thus, strength and durability are a problem with this float. Also, the number of parts used and the relatively large expense involved in manufacturing are disadvantages of this type of fishing float.

There are a wide variety of fishing floats available today, many of which are relatively expensive to manufacture and also suffer from other drawbacks as well. There is, therefore, a need in the art to provide fishing floats which address these and other problems.

BRIEF SUMMARY OF THE INVENTION

Briefly described, the present invention, in accordance with one embodiment, includes a tubular fishing float which includes at least one extended tubular center section and two end sections which seal the center section to form an air-tight interior cavity which provides buoyancy. The end sections include devices for attaching fishing line to the tubular fishing float. One method of manufacturing the present invention includes first extruding a hollow tube of plastic which resembles a very wide drinking straw. Alternately, a baffled tube is utilized. Each end of the tube is pressed together, sealed, and knurled. One or more holes are cut into each end section to provide a device for attaching a fishing line. In one method of the present invention, the fishing line is wrapped around the center section to increase the drag, thus increasing the tubular fishing float's grip on a particular position of the fishing line, while allowing for quick adjustment of the tubular fishing float's location along the line.

Various other embodiments are within the scope of the present invention and include one or more of the following: tubular fishing floats with funnel shaped indentures around the holes in the end sections that facilitate attachment of a fishing line; tubular fishing floats with variously bent end sections that allow the tubular fishing floats to selectively function as "sliders"; tubular fishing floats having one end section with a large hole designed for quick attachment to a fishing line; tubular fishing floats with various spin-welded end sections; tubular fishing floats with variously twisted and cut end sections; tubular fishing floats with ends that are flattened and curled to form circular snap-in attachment devices; tubular fishing floats with reinforced end sections; tubular fishing floats with resilient features that allow the tubular fishing float to function as a device that can be "quickly snapped" to a fishing line; tubular fishing floats with pellets disposed therein; tapered tubular fishing floats; and tubular fishing floats with longitudinal slots into which the fishing line can be oriented. Also provided are various methods and devices for fabricating tubular fishing floats, including an automated process that continuously extrudes, seals, and cuts tubular fishing floats. Also, application Ser. No. 07/619,234 filed Nov. 28, 1990, allowed Jan. 28, 1992, and issued on Jul. 14, 1992, as Pat. No. 5,129,178 is incorporated herein by reference in its entirety.

It is therefore an object of the present invention to provide a tubular fishing float which includes a tubular center section and end sections which enclose the center section to form an air-tight compartment to provide buoyancy.

Another object of the present invention to provide a tubular fishing float which includes a baffled tubular center section and end sections which enclose the baffled tubular center section to form air-tight, baffled compartments that provide buoyancy.

Another object of the present invention is to provide a tubular fishing float which includes an extended tubular center section and two end sections which enclose the center section and provide devices for attaching a fishing line to the tubular fishing float, wherein the tubular fishing float is adaptable to rapid attachment and rapid adjustment along the fishing line.

Another object of the present invention is to provide a tubular fishing float with spin-welded ends.

Yet another object of the present invention is to provide a tubular fishing float which includes a tubular center section and end sections which are turned in the form of circular snap-in attachment devices.

Still another object of the present invention is to provide a tubular fishing float with pellets therein.

Still another object of the present invention is to provide an automated method and apparatus for fabricating tubular fishing floats.

Still another object of the present invention is to provide a tubular fishing float which is simple in design, inexpensive to manufacture, rugged in construction, easy to use, efficient in operation, and which has structural integrity.

Still another object of the present invention is to provide a tubular fishing float which is sensitive to light fish bites, provides good visibility to the fisherman, and provides indication that the fishing tackle is on the water bottom.

Other objects, features and advantages of the present invention will become apparent upon reading and understanding the present specification, when taken in conjunction with the accompanying drawings.

BRIEF DESCRIPTION OF THE DRAWINGS

FIG. 1b is a side elevational view of the tubular fishing float, in accordance with the embodiment of FIG. 1a.

FIG. 1c is a top view of the tubular fishing float, in accordance with the embodiment of FIG. 1a.

FIGS. 2b-2m are cross-sectional, cut-away, schematic views of baffled tubular fishing floats, in accordance with other embodiments of the present invention, from a perspective identical to that of FIG. 2a.

FIGS. 4b-4e are cross-sectional views of the channel assembly taken along lines 4b—4b, 4c—4c, 4d—4d, and 4e—4e respectively, of FIG. 4a.

FIG. 6c, is a cut-away, side, cross-sectional view of the funnelled end section taken along line 6c—6c of FIG. 6a.

FIG. 9b is a cross-sectional view of the tubular fishing float with ribbed end sections taken along line 9b—9b of FIG. 9a.

FIG. 10b is a cross-sectional view of the tubular fishing float with circular snap-in end sections taken along line 10b—10b of FIG. 10a.

FIG. 16b is a schematic, cross-sectional view of the tubular fishing float with grooved end sections and a slotted center section taken along line 16b—16b of FIG. 16a.

FIG. 21b is a cross-sectional schematic view of the quick-snap tubular fishing float taken along line 21b—21b of FIG. 21a.

FIG. 23d is a cross-sectional, schematic view of the second quick-snap tubular fishing float taken along line 23d—23d of FIG. 23a.

FIG. 24b is a cut-away, schematic, cross-sectional view of the second quick-snap tubular fishing float taken along line 24b—24b of FIG. 24a.

FIG. 24c is a cut-away, cross-sectional, schematic view of the system for fabricating the second quick-snap tubular fishing float taken along line 24c—24c of FIG. 24a.

FIG. 24d is a cut-away, cross-sectional, schematic view of the system fabricating the second quick-snap tubular fishing float taken along line 24c—24c of FIG. 24a.

FIG. 27b is a cross-sectional view of the twist float taken along line 27b—27b of FIG. 27a.

FIG. 27c is a cross-sectional view of the twist float taken along line 27c—27c of FIG. 27a.

FIG. 28 is a perspective view of a twist tool that is used in the fabrication of the twist float.

FIG. 30a is a side, cut-away view of another twisted end section of a tubular fishing float, in accordance with another embodiment of the present invention.

FIG. 30b is a cross-sectional view of the alternate twisted end section taken along line 30b—30b of FIG. 30a.

FIG. 31a is an axial, cross-sectional view of a notched tube from which a twisted end section can be fabricated.

FIG. 31b is an axial, cross-sectional view of toothed twister that is utilized to fabricate the twisted end section.

FIG. 31c is a perspective, cut-away view of the notched tube axially inserted into the toothed twister.

FIG. 31d is a cross-sectional view of the notched tube axially inserted into the toothed twister taken along line 31d—31d of FIG. 31c.

DETAILED DESCRIPTION OF THE PREFERRED EMBODIMENTS

Figure 1A:
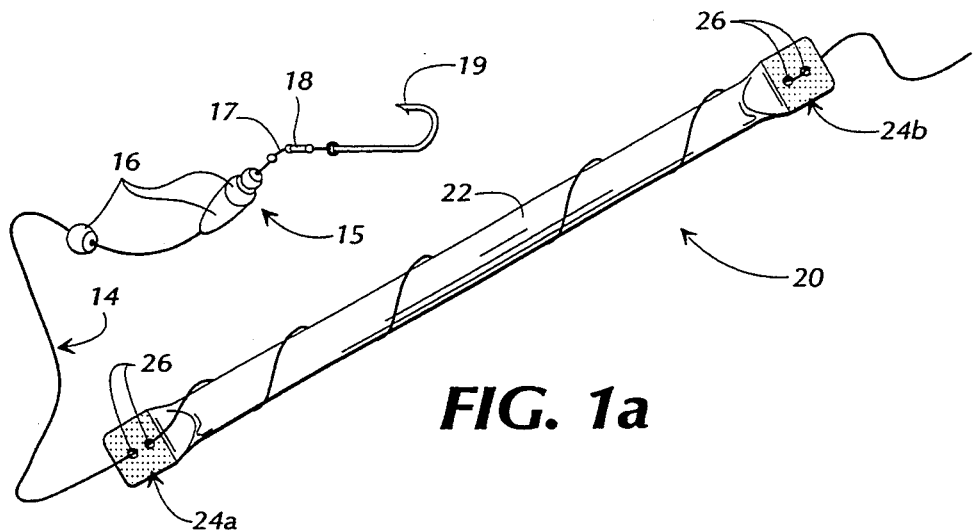
FIG. 1a is a pictorial view of a tubular fishing float, in accordance with one embodiment of the present invention, with fishing line and fishing tackle attached thereto.
Figure 1B:
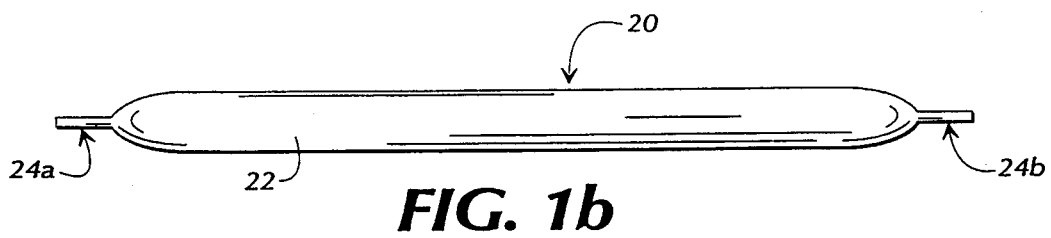
Figure 1C:
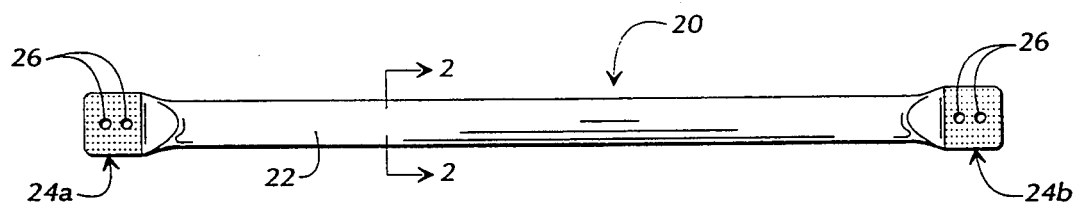

Referring now in greater detail to the drawings in which like numerals represent like components throughout the several views, FIG. 1a is a pictorial view of a tubular fishing float 20, in accordance with one embodiment of the present invention, attached to a fishing line 14 to which fishing tackle 15 is also attached. FIGS. 1b and 1c, which are side elevational and a top views of the tubular fishing float 20, respectively, show that the tubular fishing float 20 is a unitary structure and includes a center section 22 bounded by end sections 24a,b. The end sections 24a,b are flat and solid, and define attachment holes 26 therethrough. The attachment holes 26 are oriented transversely to the lengthwise axis of the tubular fishing float 20. Referring back to FIG. 1a, the fishing tackle 15 is seen including a hook 19, a quick release connector 18, a swivel 17, and sinkers 16. Fishing line 14 is seen threaded through both attachment holes 26 of each end section 24a,b and wrapped around the center section 22 of tubular fishing float 20.

Figure 2A:
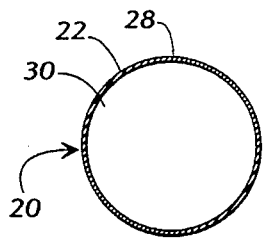
FIG. 2a is a cross-sectional, cut-away, schematic view of the tubular fishing float taken along line 2—2 of FIG. 1c.

FIG. 2a is a cross-sectional, cut-away, schematic view of the tubular fishing float 20, in accordance with the embodiment of FIGS. 1a–1c, taken along line 2—2 of FIG. 1c. A portion of the end section 24b (FIGS. 1a–c) has been cut away from FIG. 2a in an effort to more clearly show the cross-section of the center section 22. The center section 22 of the tubular fishing float 20 (FIGS. 1a–c) includes a tube wall 28 defining a float interior cavity 30. In accordance with this first embodiment, the float interior cavity 30 is completely bound by the tube wall 28 and the end sections 24a,b such that the interior cavity 30 is not in communication with the environment exterior to the tubular fishing float 20. The interior cavity 30 is an air-tight compartment which provides buoyancy.

Additional embodiments of the present invention include baffled tubular fishing floats 20' which, in accordance with several embodiments of the present invention, are shown in schematic, cross-sectional, cut-away views in FIGS. 2b–m. The views of FIGS. 2b–m are from a perspective identical to that of FIG. 2a. In accordance with certain embodiments of the present invention, the baffled tubular fishing floats 20' have exterior views that are substantially similar to the exterior views of tubular fishing floats 20. For example, the pictorial, side elevational, and top views of baffled tubular fishing floats 20' in accordance with one embodiment of the present invention are substantially similar to the views shown in FIGS. 1a–c, respectively. Likewise, other embodiments of baffled tubular fishing floats 20' have exterior views that are substantially similar to the exterior views of the various tubular fishing floats 20 discussed below. Therefore, throughout this specification, it is to be understood that, unless specifically stated otherwise or made clear from the context, a reference to a tubular fishing float 20, or any parts thereof, is also a reference to a baffled tubular fishing float 20' and the corresponding parts thereof.

Figure 2B:
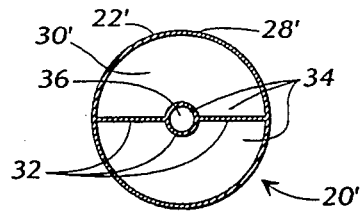
Figure 2C:
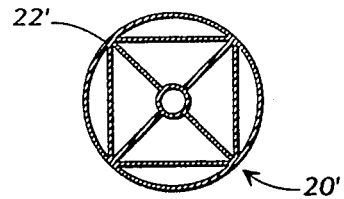
Figure 2D:
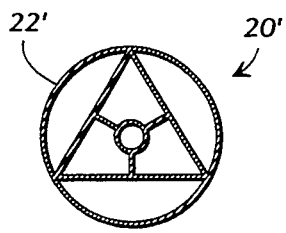
Figure 2E:
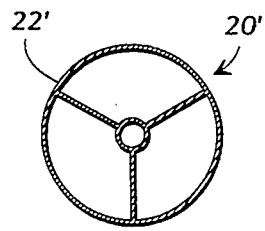
Figure 2F:
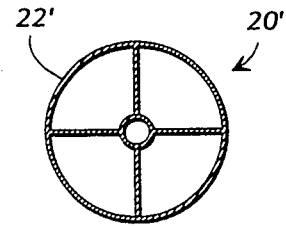
Figure 2G:
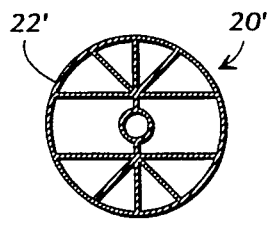
Figure 2H:
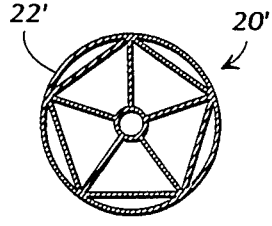
Figure 2I:
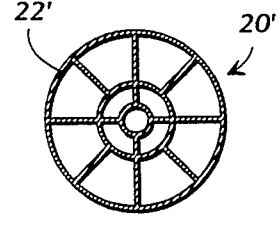
Figure 2J:
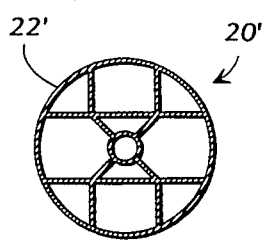
Figure 2K:
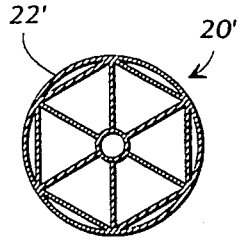

Referring specifically to FIG. 2b, a baffled tubular fishing float 20' includes a baffled center section 22' that includes a tube wall 28' defining a float interior cavity 30'. Disposed within the float interior cavity 30', and integral to the tube wall 28', are a plurality of baffle walls 32 defining a plurality of baffle compartments 34. One of the plurality of baffle compartments 34 is a centrally located, cylindrical baffle compartment 36, which will be discussed in further detail below. Baffled tubular fishing floats 20' can have greater structural integrity than tubular fishing floats 20 because of the strength that is derived by the multiple baffles 32 and the multiple sealed compartments 34.

A first step of a method of constructing a tubular fishing float 20, in accordance with one embodiment of the present invention, varies from the first step of constructing a baffled tubular fishing float 20'. A tubular fishing float 20 is constructed by first forming a hollow, open-ended tube (not shown) having an axial cross-section that is identical to the cross-section represented by FIG. 2a. Baffled tubular fishing floats 20' are constructed by first forming a baffled, open-ended tube (not shown). For example, tubes having axial cross-sections identical to those represented by the schematic cross-sections shown in FIGS. 2b–m are acceptable. In accordance with the preceding embodiments, the two open ends of the constructed tube are in communication through the tube. The hollow and baffled tubes are fabricated through common extrusion methods that are well known and relatively inexpensive. Suitable materials include those that can be extruded, that facilitate creation of an air-tight cavity, and that can be fabricated in the manners discussed below. A preferred material is durable plastic or, more particularly, polypropylene or polyethylene.

After a tube is constructed, it is cut to selected lengths. Referring back to FIGS. 1a–1c, end sections 24a,b are formed on both sides of a center section 22 by sealing both ends of the tube. Thus, an air-tight float interior cavity 30 (FIG. 2a) is formed in the tubular fishing float 20. Likewise, an air-tight float interior cavity 30' (FIG. 2b) is formed in the baffled tubular fishing float 20'. The flat nature of the end sections 24a,b allows for easy formation of the end sections 24a,b. Tubular fishing floats 20 of various lengths and diameters are within the scope of the present invention. The step of forming end sections 24a,b involves one or more of various well known sealing procedures which utilize pressure and heat, or sound or radio-waves to effectively fuse the end sections 24a,b. During this procedure, the surfaces of the end sections 24a,b are knurled to help ensure the integrity of the seals. Knurling and sealing are carried out, for example, by forcing a knurling die against the ends of the tube while the ends of the tube are maintained in a heated, soft/pliable state. Subsequently the end sections 24a,b are allowed to cool. As is evident by the above, the tubular fishing float 20 is unitary in that it is constructed from one continuous piece of material.

Referring back to FIGS. 1a–1c, the end sections 24a,b include attachment holes 26 which serve as devices for attaching fishing line 14 to the tubular fishing float 20. One method of forming the attachment holes 26 includes forcing a piercing instrument, such as a punch, through the end sections 24a,b to form attachment holes 26. In other methods, other devices capable of cutting attachment holes 26 such as, for example, drills or lasers are utilized. In still other methods, the die for knurling and sealing the end sections 24a,b is configured to form the attachment holes 26.

Referring specifically to FIG. 1a, according to one method of the present invention, a tubular fishing float 20 with end sections 24a,b is readied for use by threading one end of a fishing line 14 through the set of attachment holes 26 in one end section 24b, wrapping the end of the fishing line 14 around the center section 22 a selected number of times, and then passing the end of the fishing line 14 through the attachment holes 26 in the opposite end section 24a. The flat nature of the end sections 24a,b promotes the threading of the fishing line 14 through the attachment holes 26. Fishing tackle 15 is then attached to the end of the fishing line 14 in a conventional manner. The attachment holes 26 are sufficiently large to allow the fishing line 14 to pass easily therethrough; therefore, the tubular fishing float 20 with end sections 24a,b can move relatively freely along the fishing line 14 if the fishing line 14 is not wrapped around the center section 22. Therefore, the fishing line 14 is selectively wrapped around the center section 22 to provide friction between the fishing line 14 and the center section 22 that will selectively keep the tubular fishing float 20 from sliding along the fishing line 14. Preferably, fishing line 14 is wrapped around the center section 22 a sufficient number of times to keep the tubular fishing float 20 from sliding relative to the fishing line 14 when actually fishing, but few enough times to allow for the placement and re-adjustment of the tubular fishing float 20 relative to the fishing line 14 in the manner discussed below.

According to one method, the location of the tubular fishing float 20 with end sections 24a,b along the fishing line 14 is easily changed by grabbing a portion of fishing line 14 that is disposed between the end sections 24a,b. Then, for example if the distance between the tubular fishing float 20 and fishing tackle 15 is too great, fishing line 14 is pulled through the attachment holes 26 in end section 24a to draw the fishing tackle 15 toward the tubular fishing float 20. The slack is then taken out of fishing line 14 between the end sections 24a,b by grasping the fishing line 14 between the tubular fishing float 20 and the fishing pole (not shown) and pulling the fishing line 14 through the attachment holes 26 in the end section 24b. This process is repeated until the desired distance between the tubular fishing float 20 and fishing tackle 15 (FIG. 1a) is established. If the distance between the tubular fishing float 20 and fishing tackle 15 is not great enough, adjustments are made in a similar but opposite manner, as would be understood by those reasonably skilled in the art upon understanding this disclosure.

Once the fishing tackle 15 and tubular fishing float 20 are appropriately attached to the fishing line 14, the fishing line 14 can be cast in a conventional manner. As fishing line 14 is cast, the aerodynamic shape of the tubular fishing float 20 avoids unduly shortening the distance of the cast and allows the tackle 15 and tubular fishing float 20 to be accurately cast. When the tubular fishing float 20 is in the water, it will typically float erect if the fishing tackle 15 is off the water bottom and heavy enough to pull one end section 24a below the water level. When erect, the tubular fishing float 20 can be seen from afar. In accordance with one embodiment of the present invention, tubular fishing floats 20 are constructed of bright materials so as to enhance their visibility. Due to the cylindrical shape of the tubular fishing floats 20, they offer little resistance to being pulled under when a fish strikes, providing sensitivity to light bites on the hook 19. Furthermore, a lateral strike on the hook 19 will cause the tubular fishing float 20 to "wave" from side to side, thus "flagging" that there has been a strike.

End sections 24a,b shown in FIGS. 1a-c are only one form of end sections included in the present invention. For example, while it is shown in FIGS. 1a and 1c that the end sections 24a,b include two attachment holes 26, in accordance with other embodiments of the present invention, end sections include only one attachment hole (not shown), a plurality of alternately placed attachment holes (not shown), and various other openings and attachment means. Also included within the scope of the present invention are various end sections disclosed in the patent incorporated by reference above and other end sections discussed below.

Figure 3A:
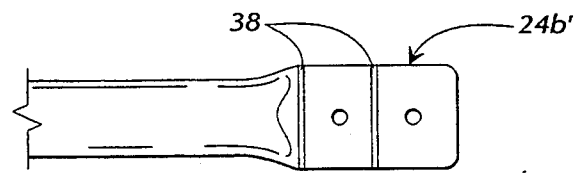
FIG. 3a is a top, cut-away view of a tubular fishing float with creased end sections, in accordance with another embodiment of the present invention.
Figure 2L:
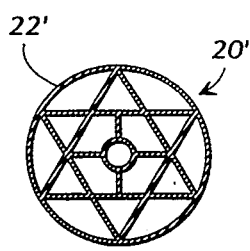

FIG. 3a is a top cut-away view of a creased end section 24b', in accordance with another embodiment of the present invention. While only one creased end section 24b' is shown, tubular fishing floats 20 with such end sections typically incorporate two creased end sections 24a,b'. Creased end section 24a,b' include fold creases 38. While FIG. 3a shows a creased end section 24b' including two fold creases 38, in accordance with other embodiments of the present invention, creased end sections 24a,b' include one or a plurality of fold creases 38.

One method of forming the fold creases 38 of the creased end sections 24a,b' includes laterally crimping end sections 24a,b (FIGS. 1a-c). According to such a method, a modified knurling die with a protrusion for crimping (not shown) seals, knurls, and crimps the creased end sections 24a,b' while they are in a heated, soft/pliable state.

Figure 3B:
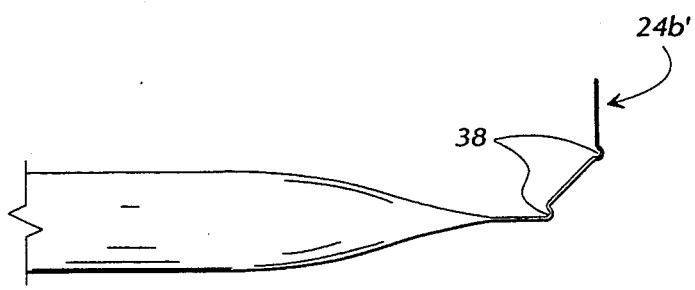
FIGS. 3b-3c are side, cut-away views of the tubular fishing float with creased end sections, wherein a creased end section is in bent configurations.
Figure 3C:
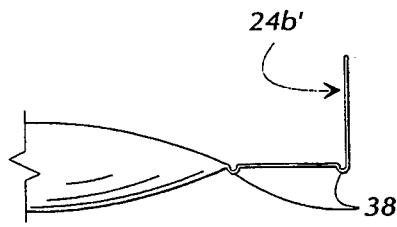
Figure 3D:
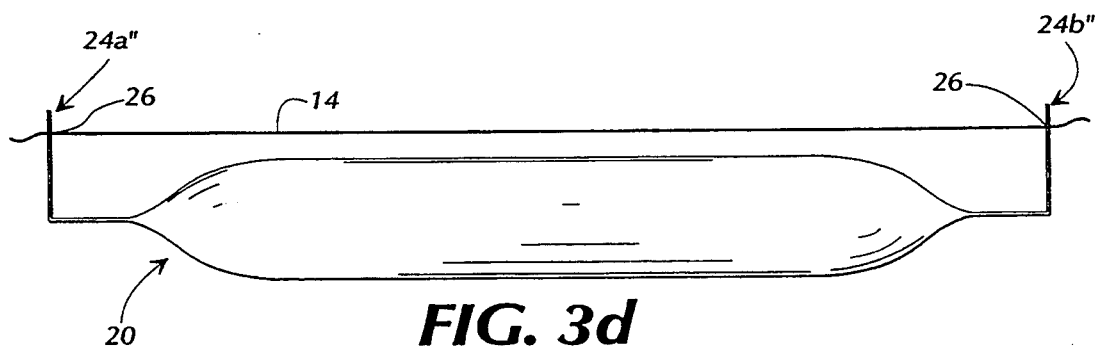
FIG. 3d is a side view of a tubular fishing float with bent end sections, in accordance with another embodiment of the present invention.

A tubular fishing float 20 with creased end sections 24a,b' is capable of functioning in the same manner as a tubular fishing float 20 with end sections 24a,b (FIGS. 1a-1c). In addition however, referring to FIG. 3d, which is a side view of a tubular fishing float 20 with bent end sections 24a,b'', a tubular fishing float 20 with creased end sections 24a,b' can easily be modified by a user to resemble the tubular fishing float 20 with bent end sections 24a,b''. Note that each of the bent end sections 24a,b'' includes a sharp bend. Referring to FIGS. 3a-c, the user bends the creased end sections 24a,b' along the fold creases 38 until the tubular fishing float 20 has bent end sections 24a,b'', as shown in FIG. 3d. The shape of the bent end sections 24a,b'' can be "set" or rigidified by briefly applying heat to the bent end sections 24a,b''. Heat can be applied, for example, by a lit cigarette lighter. Once bent end sections 24a,b'' are set, the user can selectively vary the degree to which the bent end sections 24a,b'' are bent by heating the bent end sections 24a,b'' and adjusting them accordingly.

It is also possible for a user to construct bent end sections 24a,b'' from end sections 24a,b (FIGS. 1a-c) by simply heating and bending the end sections 24a,b accordingly. It takes a little more effort, however, to form bent end sections 24a,b'' from end sections 24a,b than from creased end sections 24a,b'. Also, it is more necessary that bent end sections 24a,b'' formed from end sections 24a,b be set by applying heat to them and subsequently allowing them to cool.

Figure 4A:
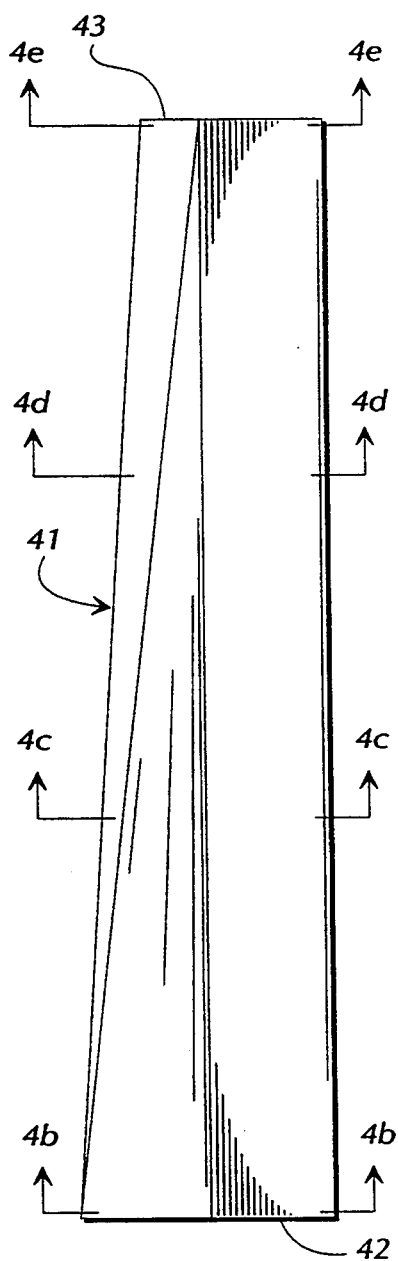
FIG. 4a is a top view of a channel assembly that is used, in accordance with one embodiment of the present invention, to fabricate the tubular fishing float with bent end sections.
Figure 4E:
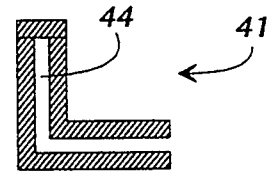
Figure 4D:
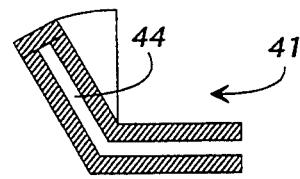
Figure 4C:
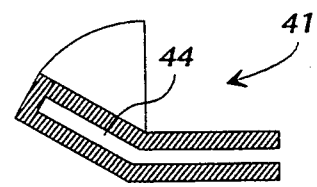
Figure 4B:
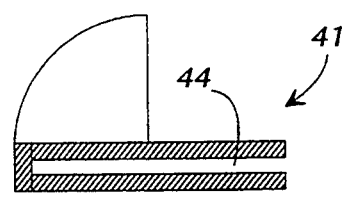

According to one method of the present invention, tubular fishing floats 20 with bent end sections 24a,b'' are fabricated during the initial fabrication process. Referring to FIG. 3d, a tubular fishing float 20 with bent end sections 24a,b'' is fabricated, for example, by subjecting each end section 24a,b (FIGS. 1a-c) of a tubular fishing float 20 to a channel assembly 41, which is shown in FIG. 4a. FIG. 4a is a top view of the channel assembly 41, in accordance with one embodiment of the present invention, having an entrance end 42 and an exit end 43. FIGS. 4b-e are cross-sectional views of the channel assembly taken along lines 4b—4b, 4c—4c, 4d—4d, and 4e—4e, respectively, of FIG. 4a and show that the channel assembly 41 defines a channel cavity 44. The channel cavity 44 extends from the entrance end 42 to the exit end 43 of the channel assembly 41, and the channel cavity 44 at the entrance end 42 is not angled while the channel cavity 44 at the exit end 43 is angled to the desired angle of the bent end sections 24a,b'' (FIG. 3d). The angle of the channel cavity 44 between the entrance end 42 and exit end 43 is gradually transitioned. The channel assembly 41 is heated and, for example, an end section 24a,b is passed through the channel cavity 44 from the entrance end 42 to the exit end 43, and a permanently formed bent end section 24a,b'' emerges from the exit end 42. The degree to which the bent end sections 24a,b'' are bent by the channel assembly 41 is selectively varied by varying the angle of the channel cavity 44.

Referring back to FIG. 3d, a tubular fishing float 20 with bent end sections 24a,b'' is capable of functioning as a "slider". Sliders are a type of fishing float that allow the fishing line 14 to slide relative to the fishing float. The general concept of sliders should be understood by those reasonably skilled in the industry. In order to use a tubular fishing float 20 with bent end sections 24a,b'' as a slider, fishing line 14 is threaded through the attachment holes 26 as shown. By selectively varying the degree to which the bent end sections 24a,b'' are bent, as discussed above, the speed at which the line 14 moves relative to the tubular fishing float 20 is selectively varied. Furthermore, included within the scope of the present invention are other embodiments having only one hole in each bent end section 24a,b''.

Figure 5A:
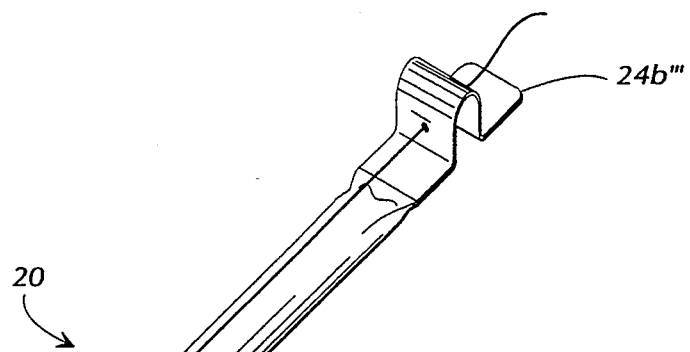
FIG. 5a is a perspective view of a tubular fishing float with round-bent end sections, in accordance with another embodiment of the present invention, with fishing line and fishing tackle attached thereto.
Figure 5B:
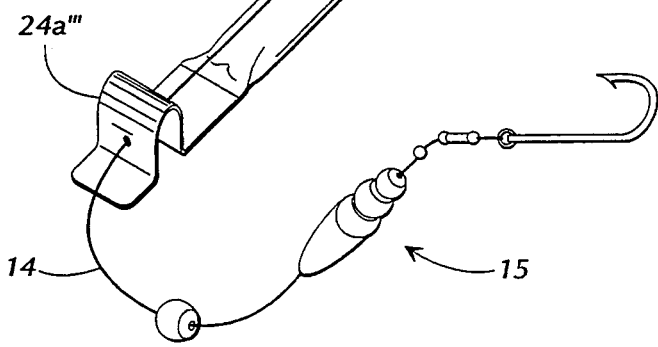
FIG. 5b is a cut-away side view of the tubular fishing float with round-bent end sections.

FIG. 5a is a perspective view of a tubular fishing float 20 with round-bent end sections 24a,b''', with fishing line 14 and fishing tackle 15 attached thereto, in accordance with another embodiment of the present invention. FIG. 5b is a cut-away side view of the tubular fishing float 20 with round-bent end sections 24a,b'''. As shown, the round-bent end sections 24a,b''' include gradual, arcuate bends. In accordance with one embodiment of the present invention, a tubular fishing float 20 with round-bent end sections 24a,b''' is used as a slider, as discussed above, and is fabricated, for example, from a tubular fishing float 20 with end sections 24a,b (FIGS. 1a–c). In addition to the fabrication steps utilized to form a tubular fishing float 20 with end sections 24a,b, a heated, rod-shaped die is used to bend and shape the round-bent end sections 24a,b''' while they are in a heated, soft/pliable state. Alternatively, an appropriately shaped die operates to appropriately seal, knurl, and shape the round-bent end sections 24a,b''' in a single step.

Figure 6B:
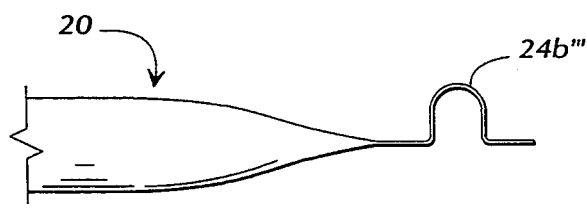
FIG. 6b is a cut-away, side view of the funnelled end section.
Figure 6A:
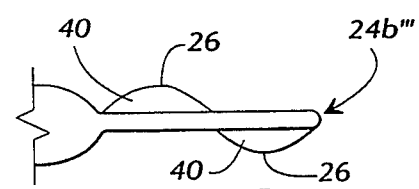
FIG. 6a is a cut-away, top view of a funnelled end section, in accordance with another embodiment of the present invention.
Figure 6C:
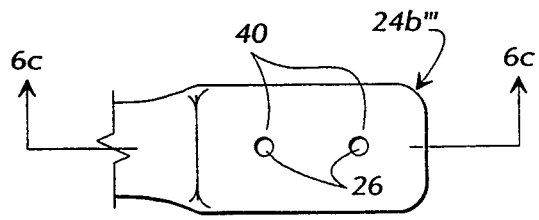

FIG. 6a is a cut-away, top view of a funnelled end section 24b'''' in accordance with another embodiment of the present invention. The funnelled end section 24b'''' includes funnels 40. While only one funnelled end section 24b'''' is shown, tubular fishing floats 20 typically incorporate two funnelled end sections 24a,b'''', as would be understood based upon the above disclosure. The funnels 40 make it easier to thread the fishing line 14 through the attachment holes 26 in the funnelled end sections 24a,b'''', as will be discussed below. Referring to FIG. 6b, which is a side view of the funnelled end section 24b'''' shown in FIG. 6a, funnels 40 are defined by the end section 24b'''' and, in accordance with the embodiment of FIGS. 6a–c, are oppositely oriented. Referring to FIG. 6c, which is a side cross-sectional, cut-away view taken along line 6c—6c of FIG. 6a, an attachment hole 26 is located at the apex of each funnel 40. While FIGS. 6a–c show a funnelled end section 24b'''' including two funnels 40 and an attachment hole 26 in each, in accordance with other embodiments of the present invention funnelled end sections 24a,b'''' include one or a plurality of funnels 40 with an attachment hole 26 in each.

The funnels 40 are formed, for example, in end sections 24a,b (FIGS. 1a–c) while they are in a heated, soft/pliable state by applying force to the region around the attachment holes 26 in the direction in which a funnel 40 is to be formed. In other embodiments the funnels 40 are formed using a punch die that defines a shape that is opposite of the desired funnel shape, or by utilizing a die that is appropriately shaped to seal, knurl, and funnel the funnelled end sections 24a,b''''. In accordance with one embodiment, tubular fishing floats 20 with funnelled end sections 24a,b'''' function similarly to tubular fishing floats 20 with end sections 24a,b (FIGS. 1a–1c). The funnels 40, however, simplify the step of threading the fishing line 14 through the attachment holes 26. Once the end of the fishing line 14 is within a funnel 40, it slides easily into and through the attachment hole 26 associated therewith.

Figure 7A:
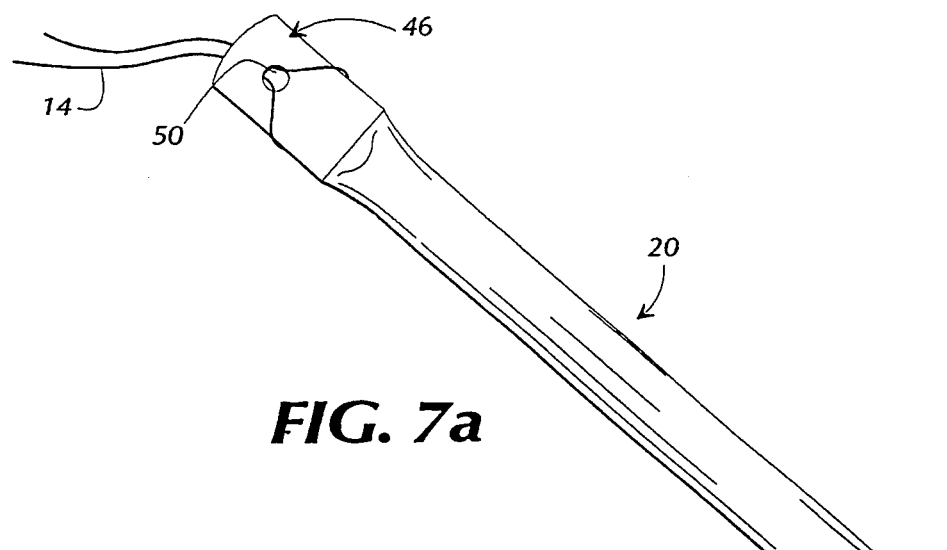
FIG. 7a is a perspective view of a tubular fishing float, in accordance with another embodiment of the present invention, incorporating a quick connect end section and a plain end section.
Figure 7B:
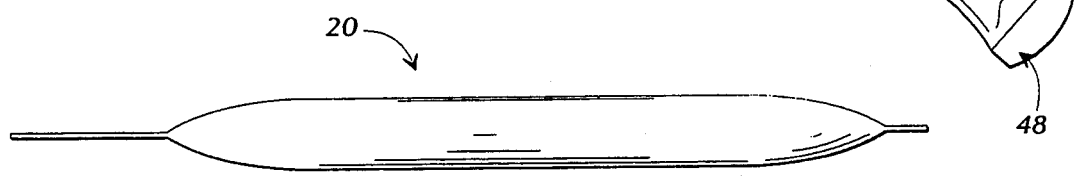
FIG. 7b is a side view of the tubular fishing float incorporating a quick connect end section and a plain end section.

FIGS. 7a and 7b show a perspective and side view, respectively, of a tubular fishing float 20 incorporating a quick connect end section 46 and a plain end section 48, in accordance with another embodiment of the present invention. The quick connect end section 46 is similar to the end sections 24a,b in that it seals the float interior cavity 30 (FIGS. 2a–2m). However, referring to FIG. 7a, the quick connect end section 46 is a little bit longer and defines a large hole 50 therethrough. Therefore, the quick connect end section 46 facilitates quick connection and disconnection of the fishing line 14, as is discussed below. As shown, the fishing line 14 connects only to the quick connect end section 46. Therefore, the plain end section 48, while being similar to the end sections 24a,b in that it seals the float interior cavity 30 (FIGS. 2a–2m), is relatively small and does not define any holes.

The quick connect end section 46 and plain end section 48 are formed in the same manner as the end sections 24a,b (FIGS. 1a–1c) except that the size of the portion of the tube that is sealed to form the quick connect end section 46 and plain end section 48 is selectively increased and decreased, respectively. Also, no hole is formed in the plain end section 48. The large hole 50 is formed in the quick connect end section 46 in a manner similar to that in which the attachment holes 26 (FIGS. 1a–c) are formed 26 except, for example, that a larger instrument is used.

Referring to FIG. 7a, The tubular fishing float 20 with a quick connect end section 46 is attached to a fishing line 14 by pushing a loop of fishing line 14 through the large hole 50, drawing the loop over the plain end section 48, and drawing the loop tightly around the quick connect end section 46, as shown.

Figure 2M:
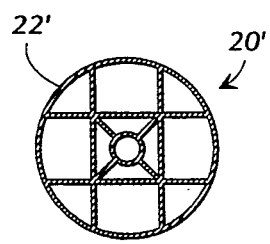
Figure 8A:
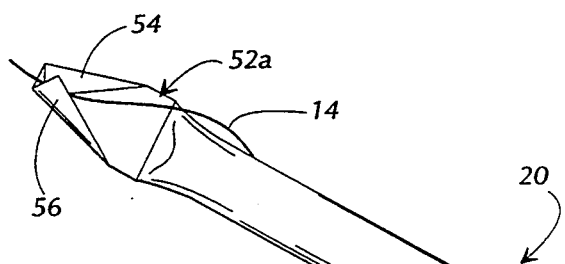
FIG. 8a is a perspective view of a tubular fishing float with folded end sections, in accordance with another embodiment of the present invention, with fishing line attached thereto.
Figure 8B:
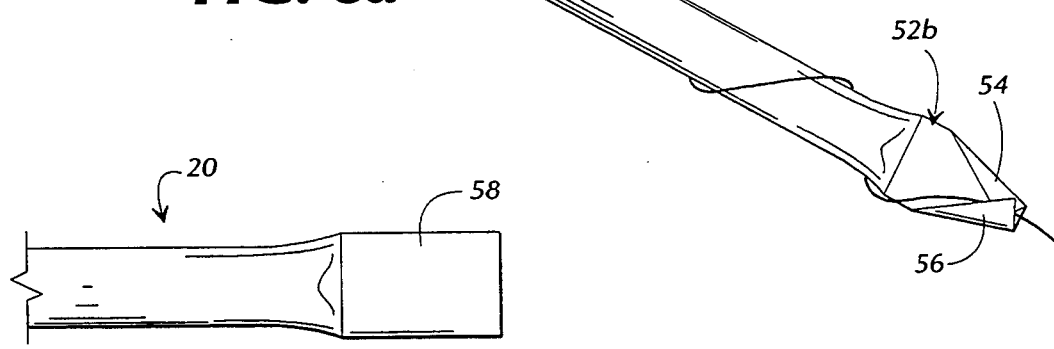
FIG. 8b is a cut-away, top view of a tubular fishing float with sealed end portions.
Figure 8C:
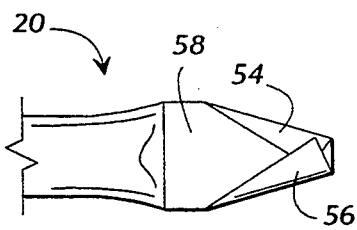
FIG. 8c is a cut-away, top view of the tubular fishing float with folded end sections.

FIG. 8a is a perspective view of a tubular fishing float 20 with folded end sections 52a,b, in accordance with another embodiment of the present invention. As discussed below, the folded end sections 52a,b serve as "quick-snap" devices that allow for quick attachment and detachment between the tubular fishing float 20 and the fishing line 14. The folded end sections 52a,b include a first fold 54 and a second fold 56 that overlaps the first fold. Referring also to FIG. 8b, which is a cut-away, top view of a tubular fishing float 20 with sealed end portions 58, folded end sections 52a,b are formed by first sealing the ends of a tube as discussed above to make a sealed end portion 58. Then, referring also to FIG. 8c, which is a cut-away, top view of the tubular fishing float 20 with folded end sections 52a,b, a first fold 54 is made to the sealed portion 58 and subsequently a second fold 56 is made to the sealed portion 58. This folding is completed while the sealed portion 58 is in a heated, soft, pliable state. Once cooled, the folds 54,56 become resilient and biased toward a folded configuration. It is preferable to construct folded end sections 52a,b on baffled tubular fishing floats 20' (FIGS. 2b–m) because these floats generally have more material available for the formation of the folds 54,56. It is particularly thought that the baffled tubular fishing float 20' having the baffled center section 22' shown in FIG. 2m is best suited for the formation of the folded end sections 52a,b. In accordance with another embodiment of the present invention, extra material is added to the sealed portion 58, in the manner discussed below, to further facilitate resilience of the folds 54,56.

In general, a tubular fishing float 20 with folded end sections 52a,b is used in a manner that is similar to the way in which a tubular fishing float 20 employing end sections 24a,b is used. However, the fishing line 14 is easily "snapped" underneath the folds 54,56 such that it is not necessary to thread the end of the fishing line 14 under the folds 54,56. The folds 54,56 are lifted slightly and a middle portion of the fishing line 14 is manually slid under the folds 54,56. Once the fishing line is under the folds 54,56, the resilient and biased nature of the folds 54,56 maintains the fishing line under the folds 54,56. Furthermore, the folds 54,56 can be lifted slightly such that fishing line 14 can be manually removed from the tubular fishing float 20.

Figure 9A:
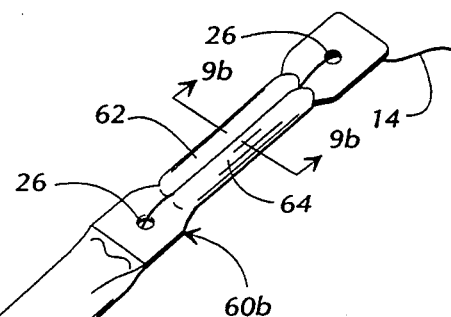
FIG. 9a is a perspective view of a tubular fishing float with ribbed end sections, in accordance with another embodiment of the present invention.
Figure 9B:
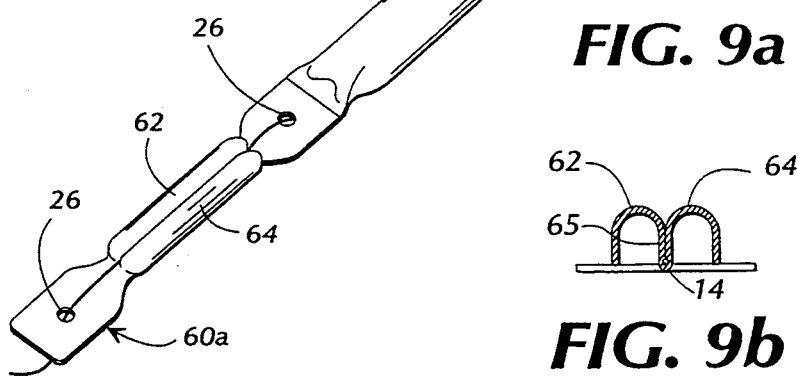

FIG. 9a is a perspective view of a tubular fishing float 20 with ribbed end sections 60a,b, in accordance with another embodiment of the present invention. The ribbed end sections 60a,b define attachment holes 26. Referring also to FIG. 9b, which is a cross-sectional view of the ribbed end section 60b taken along line 9b—9b of FIG. 9a, the ribbed end sections 60a,b further include a first rib 62 and a second rib 64 engaging the first rib 62. Ribbed end sections 60a,b are formed by sealing the ends of a tube as discussed above to make an elongated sealed portion (not shown). At the same time as the sealing, or subsequently while the elongated sealed portion is in a heated, soft, pliable state, the ribs are formed by a die or other conventional means. Once cooled, the ribs 62,64 become resilient. Attachment holes 26 are formed in the ribbed end sections 60a,b in the manner discussed above.

According to one method, a tubular fishing float 20 with ribbed end sections 60a,b functions in the same manner as a tubular fishing float 20 with end sections 24a,b (FIG. 1a). Alternately, referring back to FIG. 9a, the fishing line 14 is easily "snapped" into or out of a line space 65 defined between the ribs 62,64. The fishing line 14 is shown positioned in the line space 65 in FIG. 9b. When the fishing line 14 is secured into the line space 65 between the ribs 62,64, the ribs 62,64 provide enough drag on the fishing line 14 so that it is not necessary to wrap the fishing line 14 around the center section 22 of the tubular fishing float 20. It is also thought that with appropriate materials and dimensions, the ribs 62,64 can provide enough drag on the fishing line 14 so that it is not necessary to utilize the attachment holes 26.

Figure 10A:
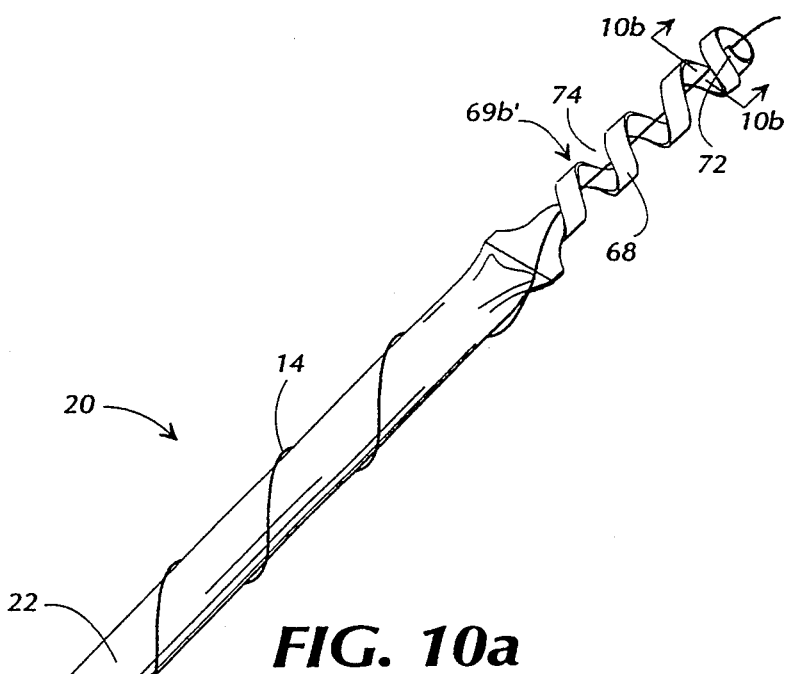
FIG. 10a is a perspective view of a tubular fishing float with circular snap-in end sections, in accordance with another embodiment of the present invention.
Figure 10B:

FIG. 10a is a perspective view of a tubular fishing float 20 with circular snap-in end sections 66a,b, in accordance with another embodiment of the present invention. FIG. 10b is a cross-sectional view of the circular snap-in end section 66b taken along line 10b—10b of FIG. 10a. Referring to both FIGS. 10a and 10b, the circular snap-in end sections 66a,b include a helical tail portion 68 having a catching portion 70 (FIG. 10b) and a resilient tail tip 72 for releasably engaging the catching portion 70. Referring to FIG. 10b, the helical tail portion 68 partially bounds a tail passage 74.

Referring to both FIGS. 10a and 10b, a tubular fishing float 20 with circular snap-in end sections 66a,b quickly attaches to the middle portion of a length of fishing line 14. Thus, a tubular fishing float 20 with circular snap-in end sections 66a,b functions as a "quick-snap device". In accordance with one method, for example, fishing line 14 is attached to the tubular fishing float 20 with circular snap-in end sections 66a,b by first positioning fishing line 14 in the tail passage 74 defined by one of the circular snap-in end sections 66b. The fishing line 14 is oriented within the tail passage 74 by first depressing the tail tip 72 so that a space is established between the tail tip 72 and the catching portion 70. A piece of fishing line 14 is passed through the space that is established between the tail tip 72 and the catching portion 70, and the tail tip 72 is then released, whereby the resilient nature of the tail tip 72 causes closure of the space between the tail tip 72 and the catching portion 70. Then, referring specifically to FIG. 10a, the fishing line 14 is, for example, wrapped about the circular snap-in end section 66b and the center section 22 of the tubular fishing float 20, and positioned within the tail passage 74 defined by the other circular snap-in end section 66a, in a reverse manner similar to that discussed above, so that the fishing line 14 is oriented as shown in FIG. 10a. In accordance with one method, the tubular fishing float 20 with circular snap-in end sections 66a,b is removed from the fishing line 14 by reversing the above procedure. Once attached to a fishing line 14, a tubular fishing float 20 with circular snap-in end sections 66a,b functions similarly to a tubular fishing float 20 with end sections 24a,b (FIGS. 1a–c). Another method in which the circular snap-in end sections 66a,b facilitate attachment to a fishing line 14 is discussed below with reference to FIG. 19.

Figure 10C:
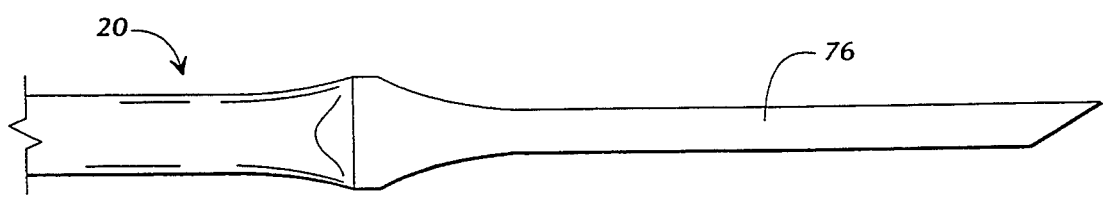
FIG. 10c is a cut-away, top view of the tubular fishing float of FIG. 10a with unfinished end sections.
Figure 10D:
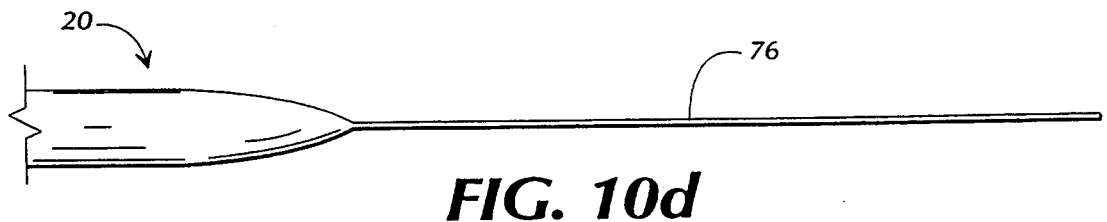
FIG. 10d is a cut-away, side view of the tubular fishing float of FIG. 10c.

A tubular fishing float 20 with circular snap-in end sections 66a,b is formed, in accordance with one method of the present invention, by first sealing the ends of a tube, in a manner similar to that discussed above, to make a narrow, elongated sealed portion 76, as shown in FIGS. 10c and 10d. FIGS. 10c and 10d are cut-away top and side views, respectively, of a tubular fishing float 20 with narrow, elongated sealed portions 76. The elongated sealed portion 76 is twisted/rolled while at the proper molding temperature to form a circular snap-in end section 66a,b. Alternatively, a circular snap-in end section 66a,b is formed from various sealed portions by twisting/rolling the sealed portion, and then appropriately cutting the sealed portion.

Figure 11:
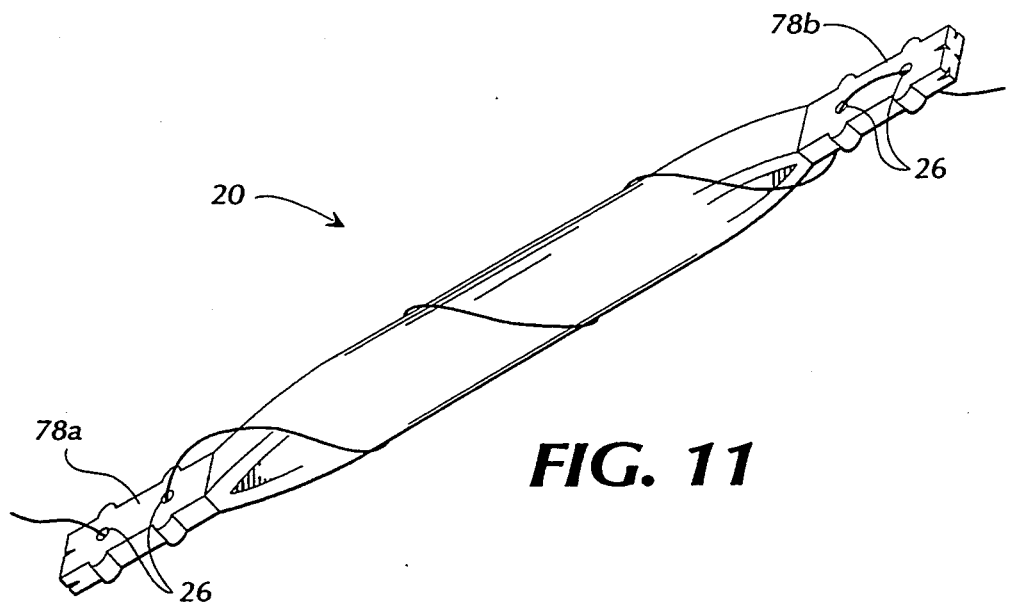
FIG. 11 is a perspective view of a tubular fishing float with reinforced end sections, in accordance with another embodiment of the present invention.

FIG. 11 is a perspective view of a tubular fishing float 20 with reinforced end sections 78a,b, in accordance with another embodiment of the present invention. The reinforced end sections 78a,b define attachment holes 26 therethrough. The tubular fishing float 20 with reinforced end sections 78a,b functions in the same manner as a tubular fishing float 20 with end sections 24a,b (FIGS. 1a–1c). However, reinforced end sections 78a,b are better suited for "heavy-duty" use.

A tubular fishing float 20 with reinforced end sections 78a,b is formed by first injecting hot plastic or, more particularly, polypropylene or polyethylene into the ends of an above described tube. Only a limited amount of material is injected into the ends of the tube so that the float interior cavity 30 (FIG. 2a) is not filled with the material. Then, according to one method, the ends of the tube are sealed and formed in a manner similar to that discussed above, with a die. When the ends are sealed and formed, reinforced end sections 78a,b are formed due to the presence of the material injected into the ends of the tube.

Figure 12A:
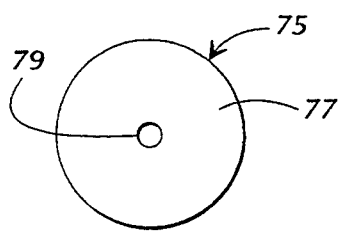
FIGS. 12a-12m are front views of injection tools used in the fabrication of tubular fishing floats, in accordance with another embodiment of the present invention.
Figure 12B:
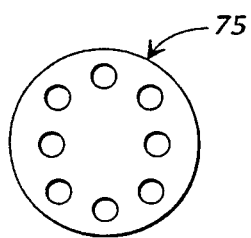
Figure 12C:
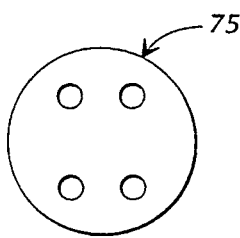
Figure 12D:
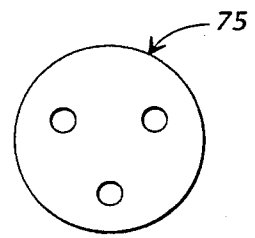
Figure 12E:
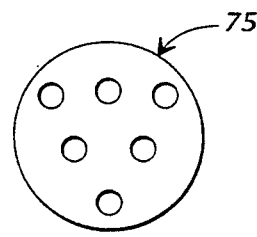
Figure 12F:
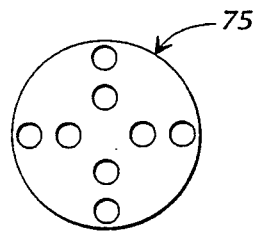
Figure 12G:
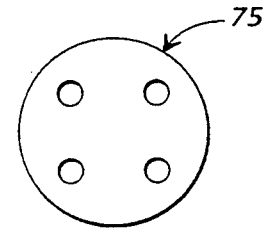
Figure 12H:
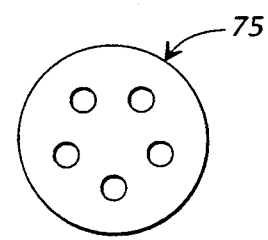
Figure 12I:
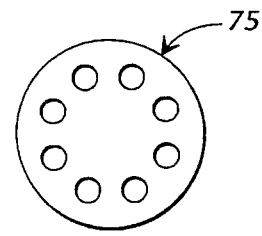
Figure 12J:
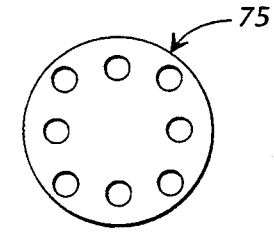
Figure 12K:
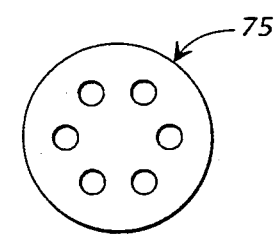
Figure 12L:
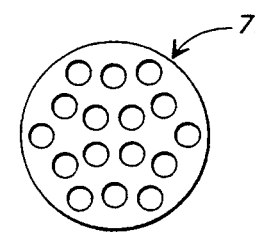
Figure 12M:
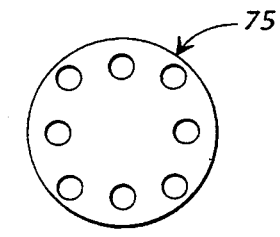

FIG. 12a, is a front view of an injection tool 75 having a base 77 and an injection port 79. In accordance with one embodiment of the present invention, hot plastic or, more particularly, polypropylene or polyethylene is injected into the ends of a tube by an injection tool 75, for example, in the process of fabricating a tubular fishing float 20 with reinforced end sections 78a,b (FIG. 11). In use, the base 77 of the injection tool 75 is brought into contact with the tube such that the injection port 79 is adjacent to the end of the tube, and material is passed from the injection port 79 into the tube. Front views of variously configured injection tools 75 are shown in FIGS. 12b–m. These variously configured injection tools 75 are configured for injection into the ends of variously baffled tubes in the process of forming baffled tubular fishing floats 20' (FIGS. 2b–m). In accordance with one embodiment of the present invention, material is injected into only a selected number of baffled compartments of a particular tube.

Figure 13A:
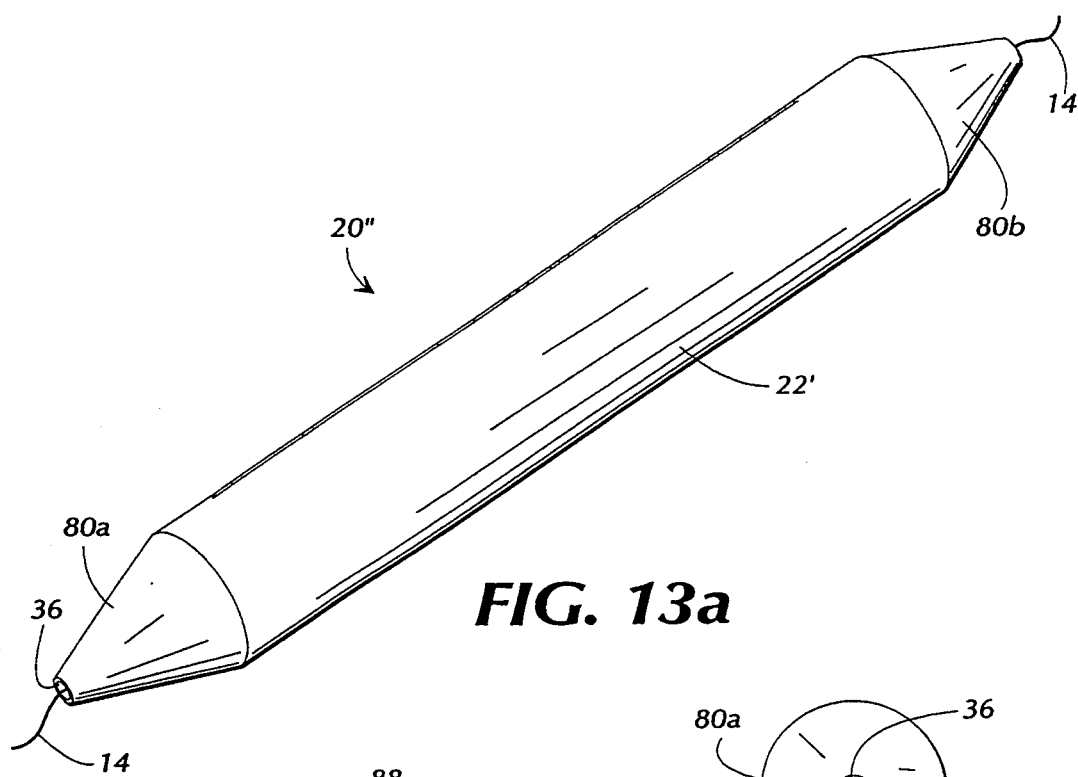
FIG. 13a is a perspective view of a spin-welded tubular fishing float with plain end sections, in accordance with another embodiment of the present invention.
Figure 13B:
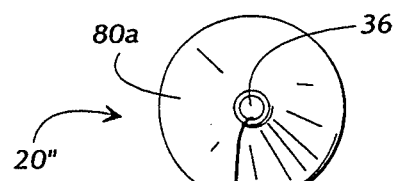
FIG. 13b is an end view of the spin-welded tubular fishing float with plain end sections.

FIG. 13a is a perspective view of a spin-welded tubular fishing float 20" in accordance with another embodiment of the present invention, with plain end sections 80a,b. Spin-welded tubular fishing floats 20" (referred to hereafter as floats 20") include baffled center sections 22', such as disclosed above (FIGS. 2b–m). Referring also to FIG. 13b, which is an end view of the float 20" shown in FIG. 13a, with the exception of the centrally located, cylindrical baffle compartment 36, the float interior cavity 30' (FIGS. 2b–m) is completely bound. Thus, all of the baffle cavities 34 (FIGS. 2b–m), except for the centrally located, cylindrical baffle compartment 36, are sealed and are air-tight. The cylindrical baffle compartment 36 is open at both plain end sections 80a,b and therebetween such that a fishing line 14 can pass therethrough. Thus, the spin-welded tubular fishing float 20" functions as a "slider", as discussed above, or, according to other methods, as a fixed float in conjunction with a tapered peg (not shown), or a "semifixed float" in conjunction with a knotted fishing line (not shown), as would be understood by those reasonably skilled in the art.

Figure 14A:
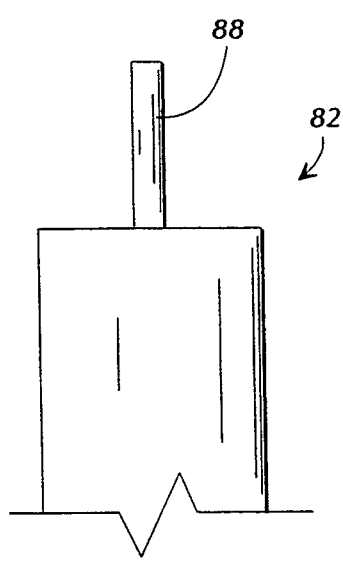
FIG. 14a is a cut-away side view of a spin-welding tool tip that can be used to form the plain end sections of FIGS. 13a and 13b.
Figure 14B:
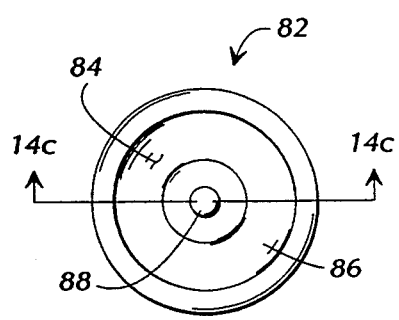
FIG. 14b is a top view of the spin-welding tool tip.
Figure 14C:
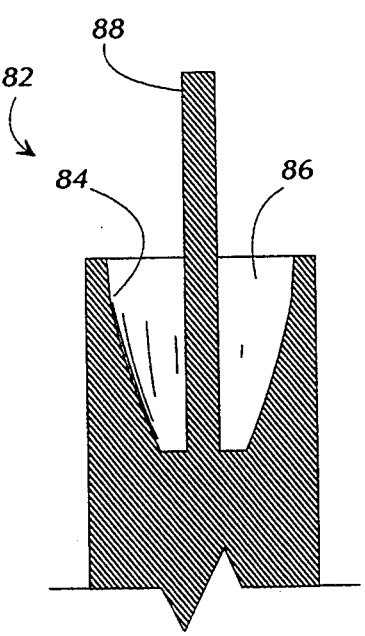
FIG. 14c a cross-sectional view of the spin-welding tool tip taken along line 14c—14c of FIG. 14b.

Floats 20" with plain end sections 80a,b are constructed by first forming a baffled, open-ended tube in the manner specified above. Then, each end of the tube is spin-welded to form plain end sections 80a,b. It is thought that spin-welding would be carried out most effectively when fabricating floats 20" from tubes having axial cross-sectional views similar to those represented in FIGS. 2i, and 2k–m. The method of spin-welding is considered well known within the art. For example, however, FIG. 14a shows a cut-away side view of a spin-welding tool tip 82 that can be operated to form the plain end sections 80a,b. A top view of the tool tip 82 is shown in FIG. 14b, and a cross-sectional view of the tool tip 82, taken along line 14c—14c of FIG. 14b, is shown in FIG. 14c. The tool tip 82 includes a forming surface 84 that defines a shaping indenture 86 through which a post 88 protrudes. The forming surface 84, along with the post 88, defines the shape of the plain end sections 80a,b (FIGS. 13a–b). During operation of the tool tip 82, the post 88 is inserted into a centrally located, cylindrical baffle compartment of a tube (for example, see the centrally located, cylindrical baffle compartment 36 shown in FIGS. 2b–m) at one end of the open-ended tube, and the forming surface 84 is engaged against the same end of the open-ended tube. Then the tool tip 82 is forced toward the open-ended tube and rotated so that the interaction between the forming surface 84 and the end of the open-ended tube generates heat causing the material at the end of the open-ended tube to become soft and pliable. The soft and pliable material is shaped by the forming surface 84 and the centrally located, cylindrical baffle compartment of the tube is kept open by the post 88 such that a plain end section 88a is formed. Of course the tool tip 82 is withdrawn after the plain end 88a is formed. The opposite plain end section 88b is formed in the same way. The shape of the plain end sections 88a,b can be varied by altering the shape of the tool tip 82, as is discussed below.

Figure 15A:
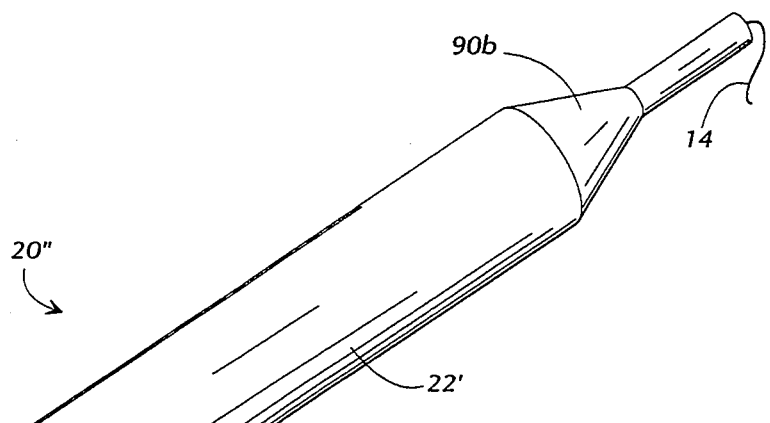
FIG. 15a is a perspective view of a tubular fishing float with pointed end sections, in accordance with another embodiment of the present invention.

In other embodiments of the present invention, the float 20" incorporates a variety of different variations to the plain end sections 80a,b (FIGS. 13a,b). For example, FIG. 15a is a perspective view of a float 20" with pointed end sections 90a,b, in accordance with another embodiment of the present invention. The pointed end sections 90a,b are different from the plain end sections 80a,b (FIGS. 13a,b) only in external shape. Thus, the centrally located, cylindrical baffle compartment 36 is open at both pointed end sections 90a,b and therebetween such that a piece of fishing line 14 can pass therethrough. However, the centrally located, cylindrical baffle compartment 36 effectively protrudes from the pointed end sections 90a,b. A float 20" with pointed end sections 90a,b is constructed in a manner similar to the float 20 with plain end sections 80a,b. The tool tip 82 (FIGS. 14a–c) is of course modified, as would be understood by those skilled in the art. Also, the float 20" with pointed end sections 90a,b functions in substantially the same manner as a float 20 with plain end sections 80a,b.

Figure 16A:
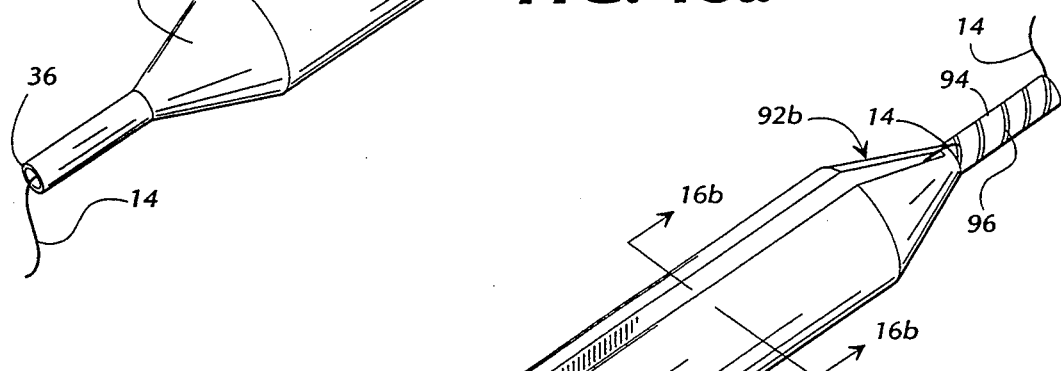
FIG. 16a is a perspective view of a tubular fishing float with grooved end sections and a slotted center section, in accordance with another embodiment of the present invention.
Figure 16B:
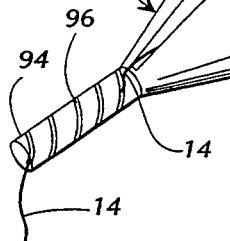
Figure 16C:
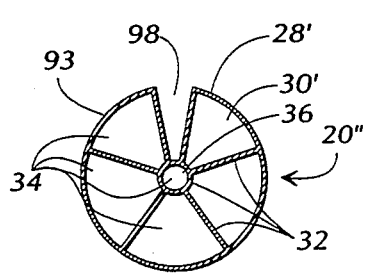
FIGS. 16c-16h are schematic, cross-sectional views of tubular fishing floats with slotted center sections, from the same perspective as FIG. 16b, in accordance with other embodiments of the present invention.
Figure 16D:
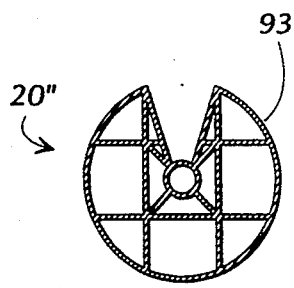
Figure 16E:
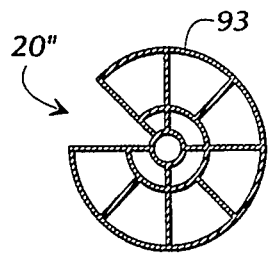
Figure 16F:
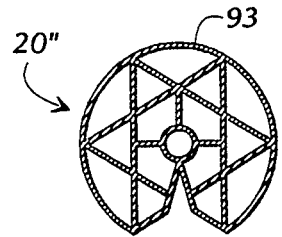
Figure 16G:
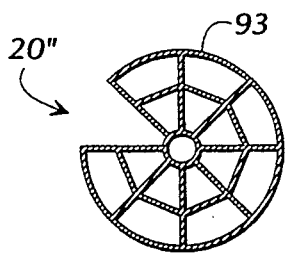
Figure 16H:
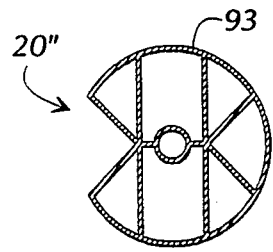

FIG. 16a is a perspective view of a float 20" with grooved end sections 92a,b and a slotted center section 93, in accordance with another embodiment of the present invention. The grooved end sections 92a,b each include a post portion 94 defining a v-shaped groove 96 that spirals around the post portion 94 in a thread-like manner. The slotted center section 93 defines a longitudinal slot 98 that extends between and into the grooved end sections 92a,b. FIG. 16b is a cross-sectional schematic view of the float 20" with grooved end sections 92a,b and a slotted center section 93 taken along line 16b—16b of FIG. 16a. Referring specifically to FIG. 16b, the slotted center section 93 is similar to baffled center sections 22' (FIGS. 2b–m) in that it includes a tube wall 28' defining a float interior cavity 30', and baffle walls 32 (only several of which are specifically identified) defining baffle cavities 34 (only several of which are specifically identified), one of the baffle cavities 34 being a centrally located, cylindrical baffle compartment 36. As specified above, however, the slotted center section 93 further includes a longitudinal slot 98. In other embodiments, variously configured slotted center sections 93 are employed. Cross-sectional schematic views of examples of acceptable slotted center sections 93, from the same perspective as FIG. 16b, are shown in FIGS. 16c–h, in accordance with other embodiments of the present invention.

Referring back to FIG. 16a, a float 20" with grooved end sections 92a,b and a slotted center section 93 is capable of being quickly attached to the middle portion of a fishing line 14 that already has fishing tackle attached thereto. In accordance with one method, for example, the fishing line 14 is wrapped into the v-shaped grove 96 of a grooved end section 90a, placed into the longitudinal slot 98, and then wrapped into the v-shaped groove 96 of the other grooved end section 90b. The v-shaped groove 96 is designed so that fishing line 14 can be wedged into and selectively retained therein by friction. Once the float 20" with grooved end sections 92a,b and a slotted center section 93 is attached to the fishing line 14, it operates in a manner that is similar to the way in which a tubular fishing float 20 utilizing end sections 24a,b (FIG. 1a–1c) operates. Of course, the grooved ends sections 92a,b facilitate quick removal and adjustment.

According to one method, a float 20" with grooved end sections 92a,b and a slotted center section 93 is constructed in a manner similar to the float 20" with pointed end sections 90a,b (FIG. 15a) except that a slightly different tool tip is used, as would be understood by those reasonably skilled in the art, so that during spin-welding, the centrally located, cylindrical baffle compartment 36 (FIG. 15a) is closed. The V-shaped groove 96 is cut into the post portion 94 and the longitudinal slot 98 is formed by cutting through the tube wall 28' and baffle walls 32 accordingly (FIG. 2b).

Figure 17A:
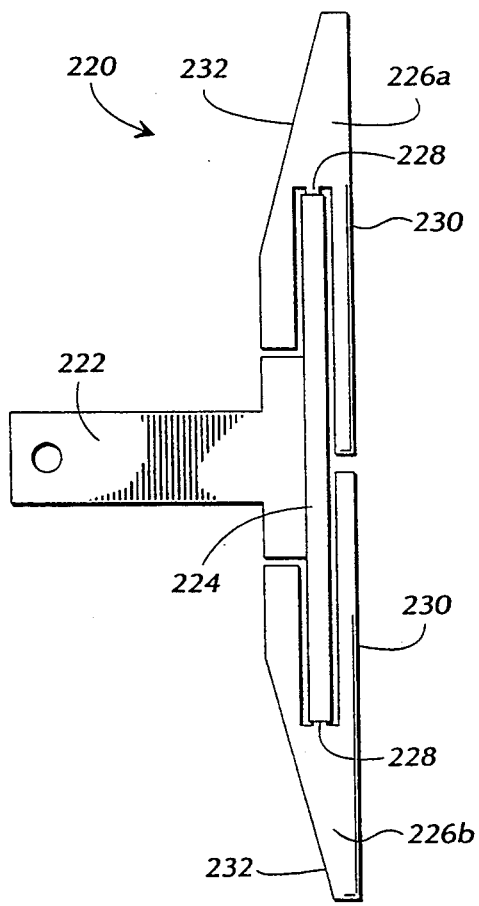
FIG. 17a is a side view of a removable forming tool that can be used in the fabrication of tubular fishing floats with a slotted center section.
Figure 17B:
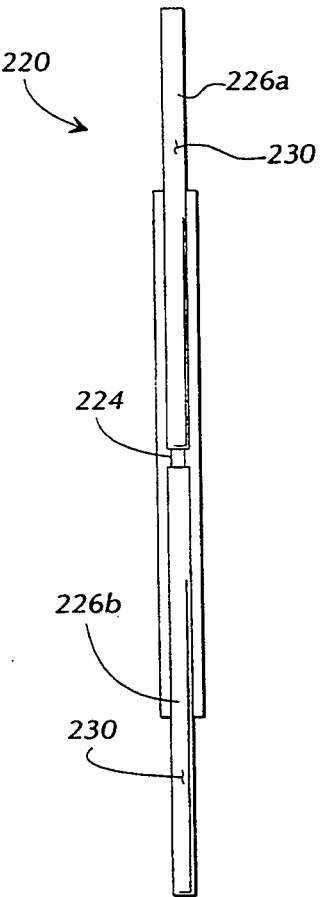
FIG. 17b is a front view of the removable forming tool.

Alternatively, a float 20" with a slotted center section 93 is constructed by spin-welding a tube (not shown) that is extruded with a longitudinal slot. For example, suitable tubes have cross-sectional views similar to those schematically shown in FIGS. 16b–h. Referring to FIGS. 17a and 17b, which are side and front views, respectively, of a removable forming tool 220, a portion of the removable forming tool 220 is placed within the longitudinal slot of the tube during spin-welding to keep the longitudinal slot from being closed. In accordance with one embodiment of the present invention, the forming tool 220 includes a bracket 222 and a rigid tube 224 mounted perpendicular thereto. Slot engagers 226a,b extend from both ends of the rigid tube 224 and include a shaft 228 passing into the rigid tube 224. A spring (not seen) is disposed within the rigid tube 224 and engages each shaft 228. The spring (not seen) functions to retain the shafts 228 within the rigid tube 224 while biasing the shafts 228, and thus the slot engagers 226a,b, away from each other. Each slot engager 226a,b includes a tube engaging surface 230 and a tool engaging surface 232.

Referring to FIGS. 16b–17b, in operation, the forming tool 220 is mated to a tube having a longitudinal slot such that a portion of the slot engagers 226a,b is within the slot, and the tube engaging surface 230 is engaging the deepest portion of the slot. A forming tool 220 of appropriate dimensions is used so that a portion of the slot engagers 226a,b, due to the biased nature of the spring within the rigid tube 224, extends from the ends of the tube before spin-welding and will not extend from the ends of the tube during spin-welding, as is explained below. With a slot engager 226a,b extending from each end of the tube from within the longitudinal slot, appropriate tool tips, as should be understood by those reasonably skilled in the art based upon this disclosure, are engaged to and used to spin-weld the ends of the tubes. The tool tips engage the tool engaging surfaces 232 of the slot engagers 226a,b and push the slot engagers 226a,b toward each other so that the spin-welding is properly carried out. The slot engagers 226a,b remain positioned in the longitudinal slot of the tube adjacent to where the spin-welding is being carried out and keep the longitudinal slot from collapsing at the end of the tubes during spin-welding. As the tool tips are removed from the tube after the spin-welding is complete, the spring within the rigid tube 224 forces the slot engagers 226a,b apart so that they protrude from the ends of the tube.

Figure 18:
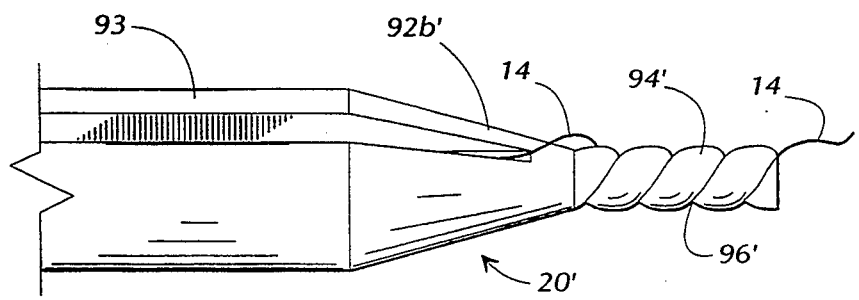
FIG. 18 is a perspective, cut-away view of a tubular fishing float with alternate grooved end sections and a slotted center section, in accordance with another embodiment of the present invention.

FIG. 18 shows a perspective, cut-away view of a float 20" with alternate grooved end sections 92a,b' and a slotted center section 93, in accordance with another embodiment of the present invention. The float 20" with alternate grooved end sections 92a,b' functions in a manner similar to the float 20" with grooved end sections 92a,b (FIG. 16a) and is fabricated in a similar manner. The fabrication process varies only in the manner in which the post portions 94' are cut. Rather than cutting a V-shaped groove 96 (FIG. 16a), a rounded V-shaped groove 96' is cut into the post portion 94'.

Figure 19:
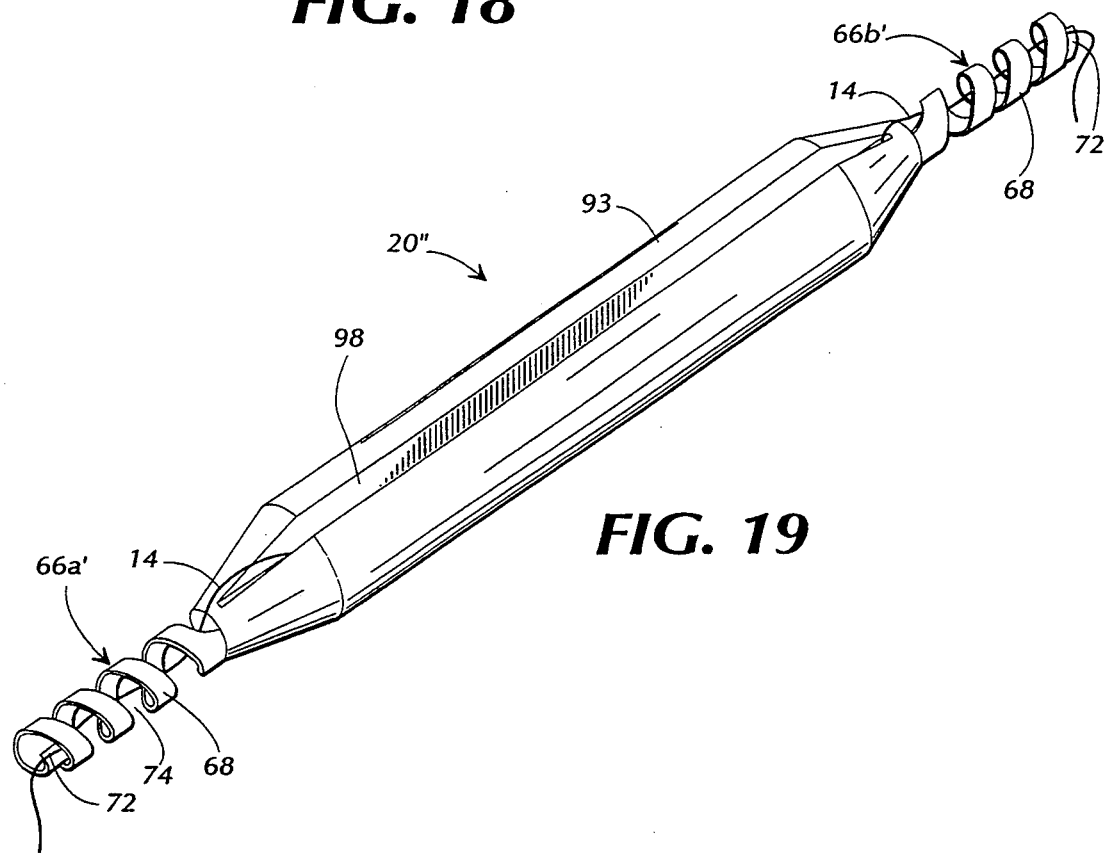
FIG. 19 is a perspective view of a tubular fishing float with alternate circular snap-in end sections and a slotted center section, in accordance with another embodiment of the present invention.

FIG. 19 shows a perspective view of a float 20" with alternate circular snap-in end sections 66a,b' and a slotted center section 93, in accordance with another embodiment of the present invention. The alternate circular snap-in end sections 66a,b' are similar to the circular snap-in end sections 66a,b (FIGS. 10a–b) by virtue of including a helical tail portion 68 having catching portion 70 (not shown in FIG. 19) and a resilient tail tip 72 for releasably engaging the catching portion 70. The helical tail portion 68 partially bounds a tail passage 74.

The float 20" with alternate circular snap-in end sections 66a,b' functions in a manner similar to the float 20" with grooved end sections 92a,b (FIG. 16). In accordance with one method, fishing line 14 is first attached to an alternate circular snap-in end section 66a' by snapping it into a position in which the fishing line 14 is secured between the catching portion 70 (FIG. 10b) and the tail tip 72. Fishing line 14 is then oriented within the tail passage 74 by wrapping the fishing line 14 about the circular snap-in end section 66a'. The fishing line 14 is then oriented in the longitudinal slot 98, wrapped into the tail passage 74 and secured between the catching portion 70 (FIG. 10b) and the tail tip 72 of the other alternate circular snap-in end section 66b'. The float 20" with alternate circular snap-in end sections 66a,b' is easily removed from the fishing line 14 by reversing the above procedure. According to one method, the float 20" with alternate circular snap-in end sections 66a,b' is fabricated in a manner similar to the float 20" with grooved end sections 92a,b (FIG. 16a). The fabrication process varies in that a different tool tip 82 is used to form the tail portion 86. Alternately, the tail portion 86 can be formed in a manner similar to which the circular snap-in end sections 66a,b are formed for the tubular fishing float 20 (FIG. 10a–b).

Figure 20A:
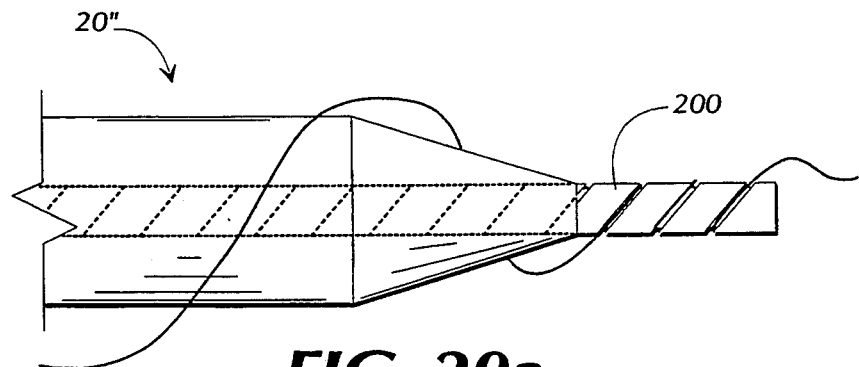
FIG. 20a is a cut-away side view of a tubular fishing float with a rod, partially shown in broken-lines, passing therethrough, in accordance with another embodiment of the present invention.
Figure 20B:
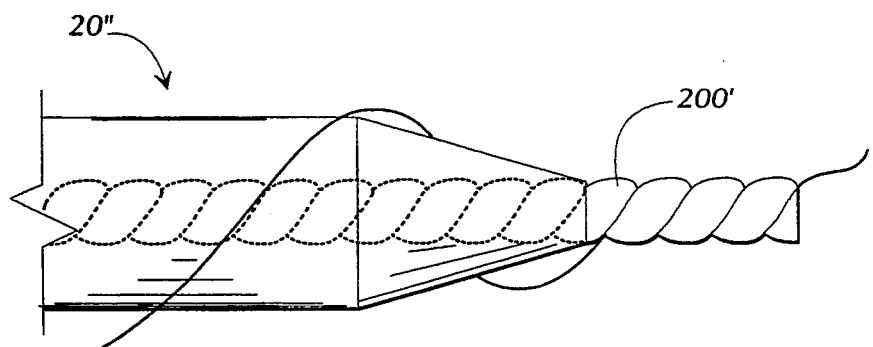
FIG. 20b is a cut-away side view of a tubular fishing float with a rod, partially shown in broken-lines, passing therethrough, in accordance with another embodiment of the present invention.

Referring back to FIGS. 16a, 18 and 19, floats similar to the floats 20" with grooved end sections 92a, with alternate grooved end sections 92a,b', and with alternate circular snap-in end sections 66a,b' are, according to certain alternate methods of the present invention, fabricated from a float 20" with a slotted center section 93 (FIGS. 16a, 18, 19) and plain end sections 80a,b (FIG. 13a). Although a float with both a slotted center section 93 and plain end sections 80a,b is not shown, the design of such a float should be understood by those reasonably skilled in the art based upon the above disclosure. For example, FIGS. 20a and 20b are cut-away side views showing floats 20" with rods 200,200' partially shown in broken-lines, passing therethrough, in accordance with two alternate embodiments of the present invention. The rods 200,200' are longer than the floats 20", and have the appropriate diameter to pass through the centrally located, cylindrical baffle compartments 36 (FIGS. 13a,b). The ends of the rods 200,200' are formed, for example, in a manner similar to which the post portions 94,94' (FIGS. 16a, 18), respectively, are formed. Glue is applied to the middle portions of the rods 200,200' and the rods 200,200' are inserted through the centrally located, cylindrical baffle compartments 36 of floats with slotted center sections 93 (FIGS. 16a, 18, 19) and plain end sections 80a,b (FIG. 13a) such that the ends of the rods 200,200' are exposed. When the glue cures, the product resembles a float 20" with grooved end sections 92a,b or alternate grooved end sections 92a,b' (FIGS. 16a and 18, respectively).

Figure 21A:
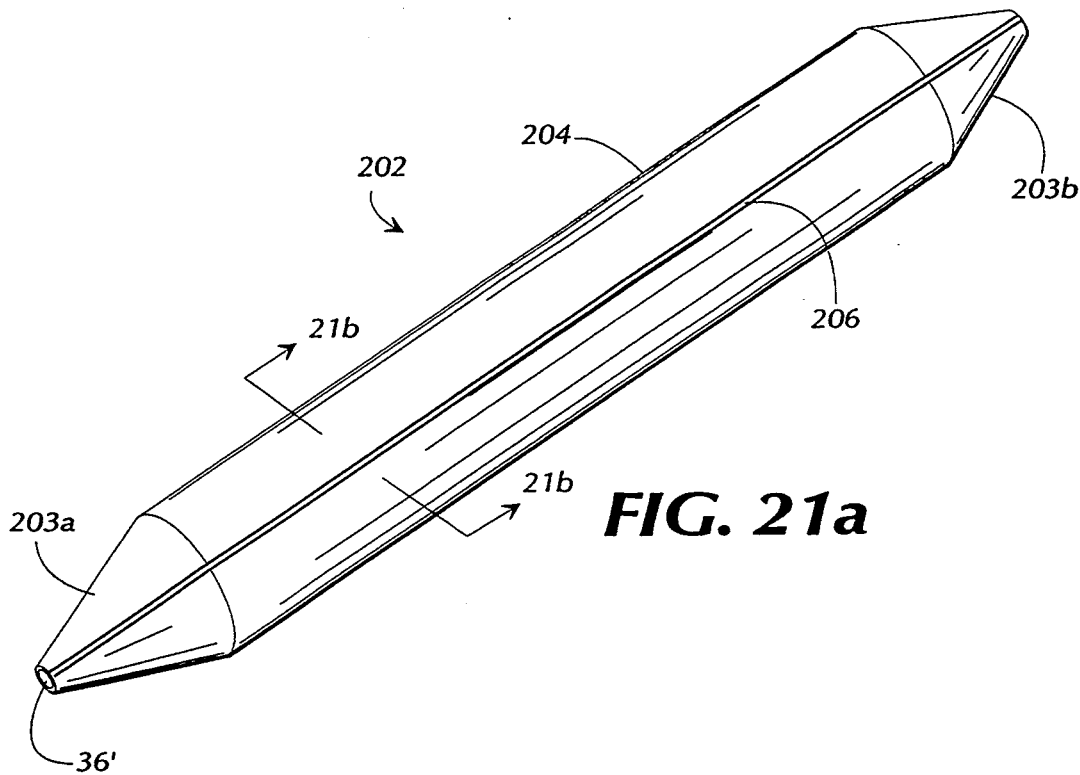
FIG. 21a is a perspective view of a quick-snap tubular fishing float in accordance with another embodiment of the present invention.
Figure 21B:
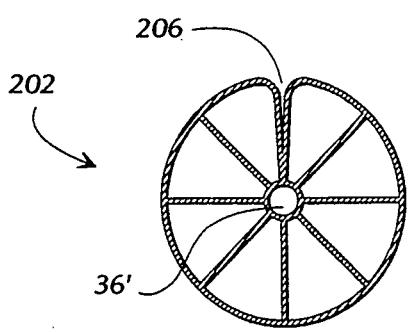

FIG. 21a is a perspective view of a quick-snap float 202 in accordance with another embodiment of the present invention. FIG. 21b is a schematic, cross-sectional view of the quick-snap float 202 taken along line 21b—21b of FIG. 21a. The quick-snap float 202 includes creviced end sections 203a,b and a creviced center section 204. The quick-snap float 202 defines a centrally located, cylindrical baffle compartment 36' that extends from one end of the quick-snap float 202 to the other, and a crevice 206 that selectively provides access to the baffle compartment 36' along the entire length of the float 202. The quick-snap float 202 is resilient in nature such that the crevice 206 is normally tightly closed.

During operation, the quick-snap float 202 is manually manipulated so that the crevice 206 opens and provides access to the centrally located, cylindrical baffle compartment 36'. An intermediate section of a fishing line 14 (FIG. 1a) is then passed through the crevice 206 and placed within the baffle compartment 36'. The quick-snap float 202 is then released and its resilient nature causes the crevice 206 to return to its normally tightly closed configuration such that the quick-snap float 202 functions as a "slider", as discussed above. Alternatively, the quick-snap float 202 is released while the fishing line 14 is positioned within the crevice 206 such that the resilient nature of the quick-snap float 202 maintains the fishing line 14 securely in the crevice 206 such that the quick-snap float 202 functions as a fixed float, in the manner discussed above.

Figure 22A:
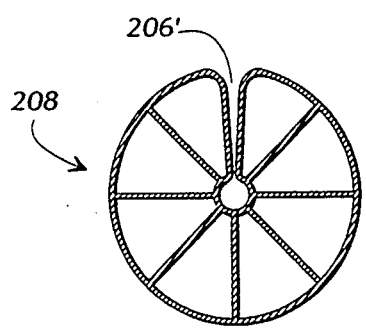
FIG. 22a is an axial, cross-sectional, schematic view of a tube from which the quick-snap tubular fishing float is constructed.

FIG. 22a is an axial, schematic, cross-sectional view of a tube 208 from which a quick-snap float 202 (FIGS. 21a–b) is constructed. The tube 206 includes an exaggerated crevice 206'. The quick-snap float 202 is formed by first spin-welding creviced end sections 203a,b (FIGS. 21a–b) onto the tube 208 utilizing a forming tool 220 (FIGS. 17a,b) in the manner discussed above to preclude closure of the exaggerated crevasse 206'. The partially formed quick-snap float 202 is then forced down a long hot barrel (not shown) that is "choked" such that the internal diameter of the barrel entrance is slightly larger than the diameter of the tube 208, while the internal diameter of the barrel exit is slightly smaller than the diameter of the tube 208. For example, it is thought that .410, 28, 20, 16, 12, and 10 gauge shotgun barrels would be suitable. A release agent, for example lanolin, is sprayed into the barrel and then tubes 208 are pneumatically forced down the barrel. This causes the gap defined by the exaggerated crevice 206' to decrease such that the exaggerated crevice 206' is transformed into a crevice 206 (FIGS. 21a–b) that functions in the manner described above.

Figure 22B:
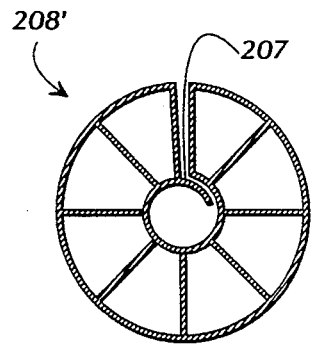
FIGS. 22b—22d show axial, cross-sectional, schematic views of alternate tubes from which alternate quick-snap tubular floats can be fabricated, in accordance with other embodiments of the present invention.
Figure 22C:
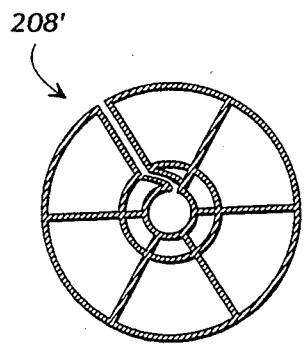
Figure 22D:
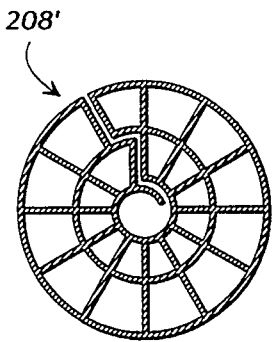

FIGS. 22b–d show axial, schematic, cross-sectional views of alternate tubes 208' from which alternate quick-snap floats (not shown) can be fabricated in the above manner. A differently configured forming tool (not shown) is employed when fabricating, for example, an alternate quick-snap float from the alternate tube 208' of FIG. 22d. Also, a containment flap 207 is shown and identified, for example, in FIG. 22b. The containment flap 207, once an alternate quick-snap float is formed from an alternate tube 208' with a containment flap 207, functions to assist in keeping the fishing line 14 (FIG. 1a) within the centrally located, cylindrical baffle compartment 36' (FIG. 21a).

Figure 23A:
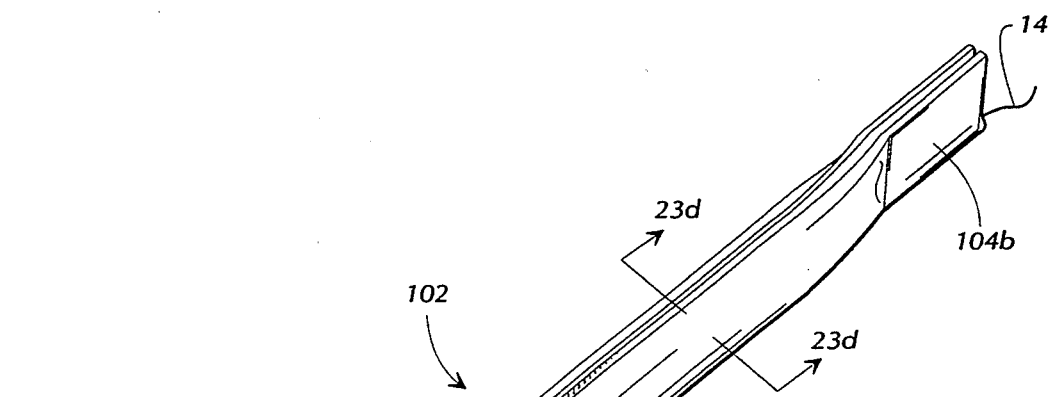
FIG. 23a is a perspective view of a second quick-snap tubular fishing float in accordance with another embodiment of the present invention.
Figure 23B:
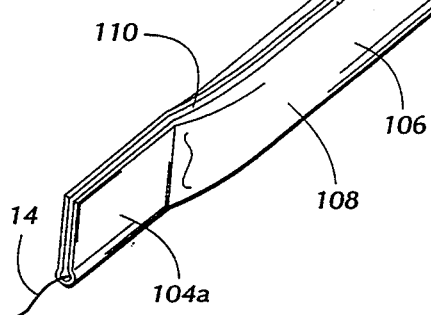
FIG. 23b is a cut-away, side view of the second quick-snap tubular fishing float.
Figure 23C:
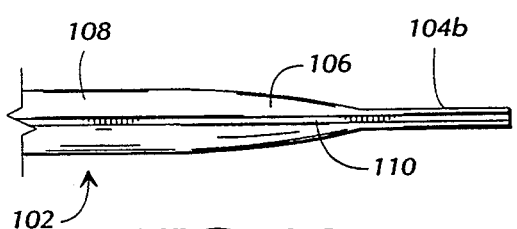
FIG. 23c is a cut-away, top view of the second quick-snap tubular fishing float.
Figure 23D:
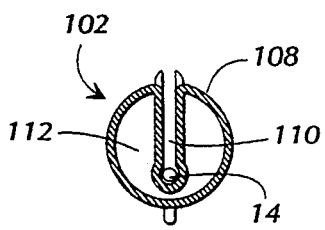

FIG. 23a shows a perspective view of a second quick-snap float 102 in accordance with another embodiment of the present invention. The second quick-snap float 102 includes sealed end sections 104a,b, a center tube section 106, and a tube wall 108 defining a tube channel 110 that extends into and the length of the second quick-snap float 102. FIGS. 23b and 23c are cut-away side and top views, respectively, of the second quick-snap float 102. FIG. 23d shows a schematic, cross-sectional view of the second quick-snap float 102 taken along line 23d—23d of FIG. 23a. As seen, the tube channel 110 extends deep into the second quick-snap float 102 and the tube wall 108 further defines a tube cavity 112 that is completely bounded by the tube wall 108 and sealed end sections 104a,b.

Referring back to FIG. 23a, the second quick-snap float 102 is capable of being quickly attached to the fishing line 14 after fishing tackle 15 (FIG. 1a) has been attached to the fishing line 14. A piece of the fishing line 14 is attached to the second quick-snap float 102 by forcing the fishing line 14 down into tube channel 110 such that one section of the fishing line 14 is extending from one sealed end section 104a and an opposite section of the fishing line 14 is extending from the opposite sealed end section 104b, as is shown. Referring to FIG. 23d, tension is appropriately applied to the fishing line 14 to cause the fishing line 14 to become disposed in the deepest portion of the tube channel 110. The tube channel 110 is sufficiently narrow/tight and, as discussed below, the second quick-snap float 102 is resilient such that the fishing line 14 can be removably secured within the tube channel such that the second quick-snap float 102 cannot move relative to the fishing line 14. When attaching or removing the second quick-snap float 102, a fisherman can force the tip of a finger into the tube channel 110, or twist the second quick-snap float 102 to better facilitate access to the tube channel 110. However, it is possible to simply snap the fishing line 14 into our out of the tube channel 110.

Figure 24B:
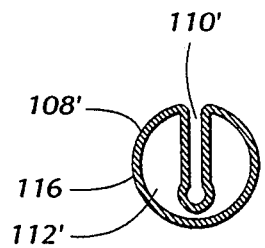
Figure 24A:
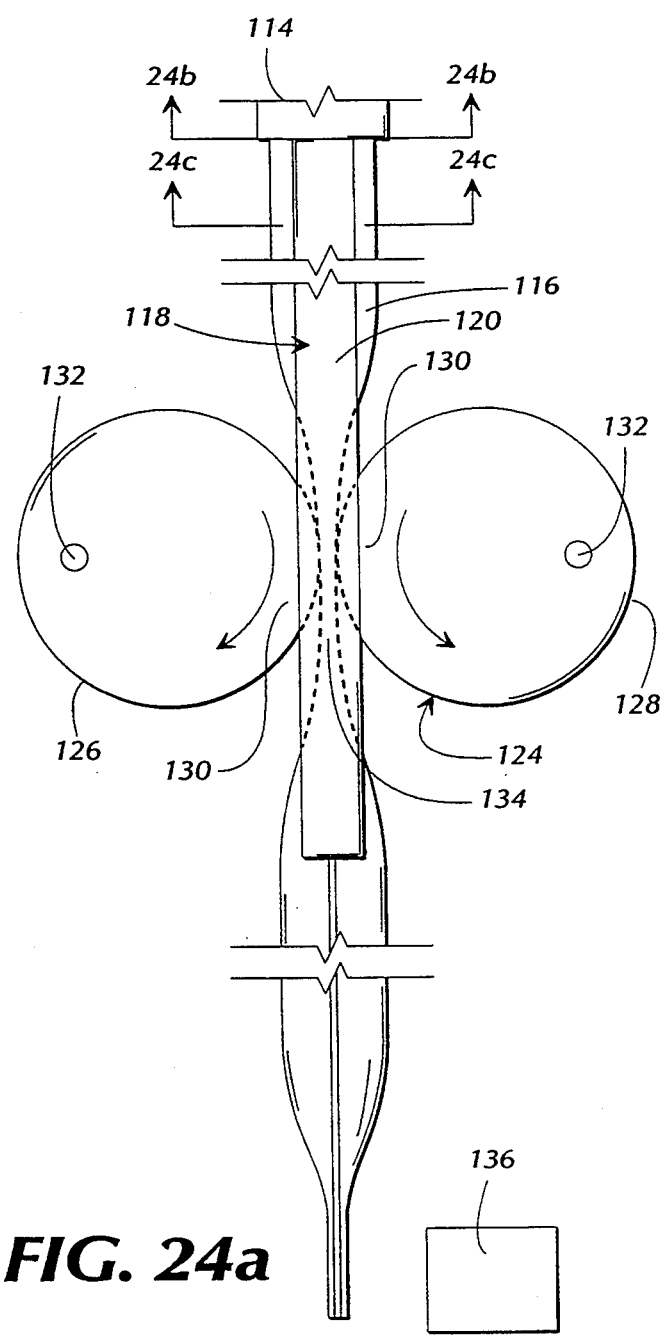
FIG. 24a is a cut-away, schematic view of a system fabricating the second quick-snap tubular fishing float.

FIG. 24a is a cut-away schematic view of a system for fabricating a second quick-snap float 102. Fabrication begins with an extruder 114. A continuous tube 116 is extruded from the extruder 114 in a conventional manner. The continuous tube 116 and the tubular fishing float 20 discussed above are extruded from the same type of materials. A T-spacer 118 extends from the extruder and is positioned in the extrusion path of the continuous tube 116.

Figure 24C:
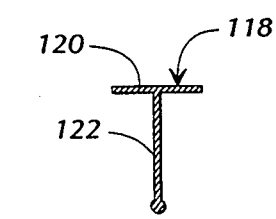
Figure 24D:
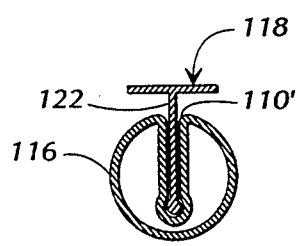

FIG. 24b is a cut-away, schematic, cross-sectional view of the continuous tube 116, taken along line 24b—24b, just downstream of the extruder 114. The extruder 114 and T-spacer 118 are not shown in FIG. 24b in order to simplify the view. The continuous tube 116 includes a tube wall 108' that defines a tube channel 110' and a tube cavity 112'. FIG. 24c is a cut-away, schematic, cross-sectional view of the T-spacer 118, taken along line 24c—24c. The extruder 114 and continuous tube 116 are not shown in FIG. 24b in order to simplify the view. As shown, the T-spacer 118 includes a support member 120 with a separator 122 depending therefrom. In FIG. 24a, only the support member 120 of the T-spacer 118 is seen. FIG. 24d is a cut-away, schematic, cross-sectional view of the T-spacer 118 and continuous tube 116 taken along line 24c—24c. The extruder 114 is not shown in FIG. 24d in order to simplify the view. As shown, the continuous tube 116 travels such that the separator 122 is disposed within the tube channel 110'. The separator 122 ensures that the tube channel 110' is maintained by keeping the portion of the tube wall 108' that is on one side of the tube channel 110' separated from the portion of tube wall 108' that is on the opposite side of the tube channel 110'.

Referring back to FIG. 24a, a sealing mechanism 124 is located downstream from the extruder 114, at a position where the T-spacer 118 is still engaging the continuous tube 116. The sealing mechanism 124 includes a first cam 126 and a second cam 128. Each cam 126,128 includes a lobe portion 130 and rotates about a cam axis 132 in a direction that complements the flow of the continuous tube 116. Each cam 126,128 is caused to rotate about its cam axis 132 in a conventional manner. The cams 126,128 are synchronize, sized, and oriented relative to the T-spacer 118 and continuous tube 116 such that lobe portions 130 cyclically engage the continuous tube 116. The lobe portions 130, in cooperation with the T-spacer 118, form elongated sealed sections 134 when engaging the continuous tube 116, as is shown by broken lines in FIG. 24a. The tube channel 110' is maintained in the elongated sealed sections 134 by the T-spacer 118, in the manner discussed above. Formation of the elongated sealed sections 134 transforms those portions of the continuous tube 116 that are not contacted by the lobe portions 130 into center tube sections 106 (FIGS. 23a–c). Heating of the T-spacer 118 and sealing mechanism 124 is understood to facilitate fabrication.

The continuous tube 116 cures downstream of the sealing mechanism 124 and passes a cutting station 136. The elongated sealed sections 134 are cut, in a conventional manner, as they pass the cutting station 136. In accordance with one embodiment of the present invention, the cutting station 136 includes a razor blade mounted on a driven wheel (not shown), wherein the razor blade cuts the elongated sealed sections 134 at their middle portion. When the elongated sealed sections 134 are cut, the fabrication of the second quick-snap float 102 is complete. The speed at which the continuous tube 116 is extruded, the cams 126,128 rotate, and the cutting section 136 operates is capable of being selectively varied to selectively vary the length of the quick-snap floats 102 that are fabricated. In another embodiment of the present invention, the tube cavity 112 (FIG. 23d) of the second quick-snap float 102 is baffled, as should be understood by those reasonably skilled in the art based upon the above disclosure.

Figure 25A:
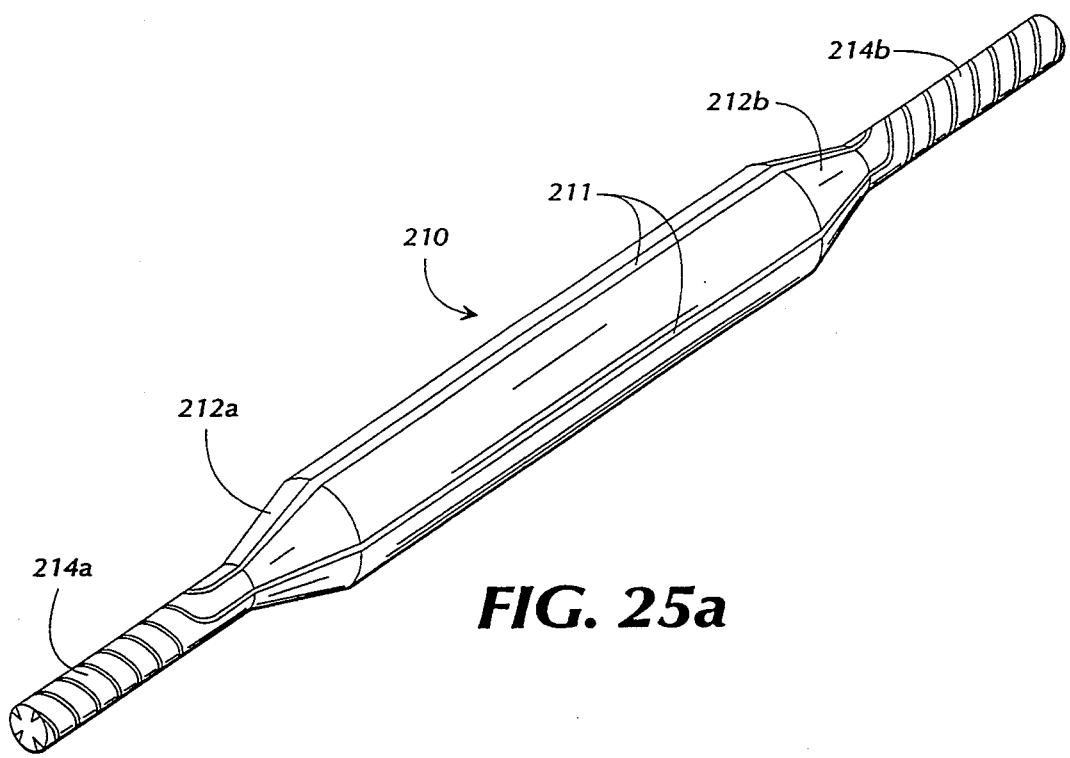
FIG. 25a is a perspective view of a grooved tubular fishing float, in accordance with another embodiment of the present invention.
Figure 25B:
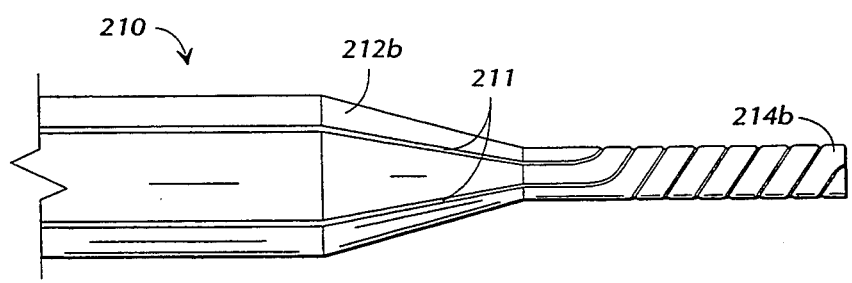
FIG. 25b is a cut-away, side view of the grooved tubular fishing float.
Figure 25C:
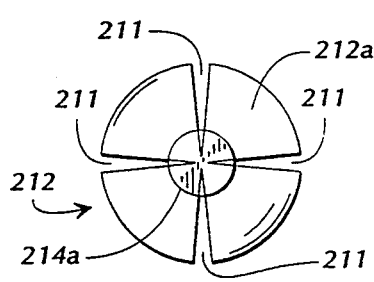
FIG. 25c is an end view of the grooved tubular fishing float.

FIG. 25a is a perspective view of a grooved float 210, in accordance with another embodiment of the present invention, having a plurality of v-grooves 211 that run the length of the grooved float 210, down sloping portions 212a,b, and around end posts 214a,b. FIG. 25b is a cut-away side view of the grooved float 210, and FIG. 25c is an end view of the grooved float 210. Fishing line 14 is attached to the grooved float 210 by securely wedging the fishing line 14 into any one of the v-grooves 211 and wrapping the fishing line 14 into the same v-grove 211 around the end posts 212a,b. The grooved float 210 is used in a manner that would be understood, based on the above disclosure, by those reasonably skilled in the art.

Figure 26:
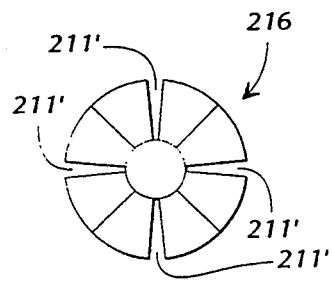
FIG. 26 is a schematic end view of a baffled tube from which the grooved tubular fishing float is constructed.

FIG. 26 is a schematic end view of a baffled tube 216 defining v-grooves 211'. The baffled tube 216 is extruded in a conventional manner from the materials described above. In accordance with one embodiment of the present invention, the grooved float 210 (FIGS. 25a–c) is constructed from a section of baffled tube 216 by heating and then manipulating each end of the baffled tube 216 with a crush/twist tool (not shown). The crush/twist tool defines a cavity into which four inwardly pointing teeth protrude. Each end of the baffled tube 216 is inserted a selected distance into the cavity of a crush/twist tool so that a tooth of the crush/twist tool is oriented within each of the v-grooves 211' of the baffled tube 216. Referring back to FIGS. 25a–c, each crush/twist tool then compresses to form sloping portions 212a,b. Each crush/twist tool then rotates while compressed and being drawn away from the baffled tube 216 to seal the ends of the baffled tube 216 and form the end posts 214a,b with v-grooves 211' thereon.

Figure 27A:
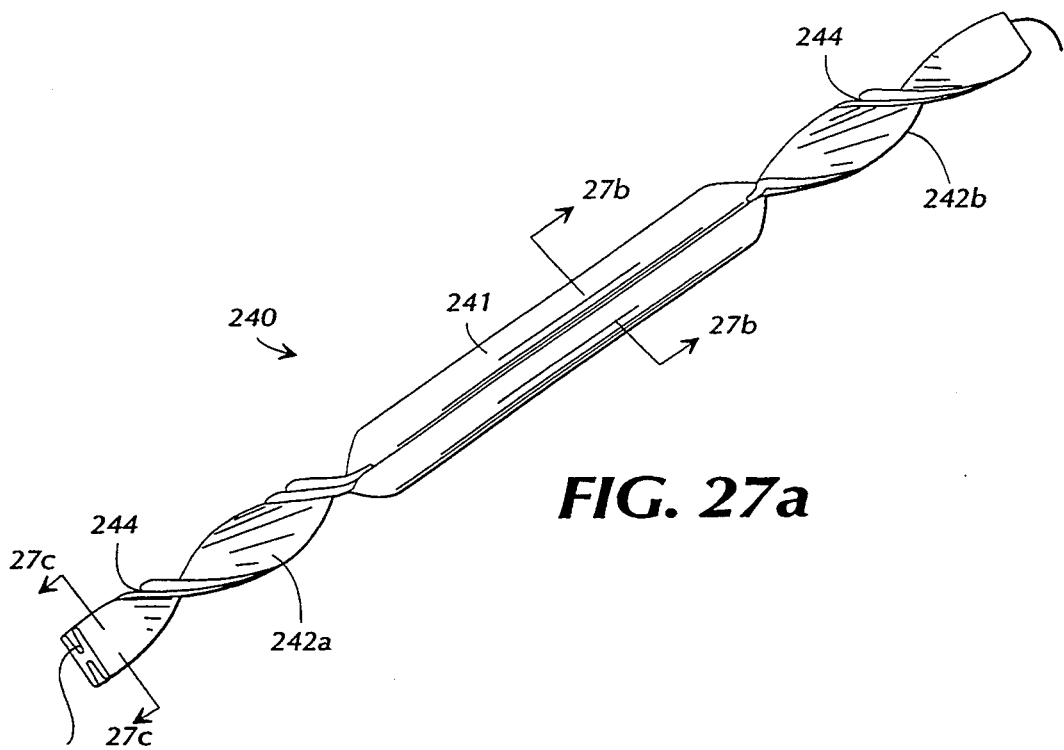
FIG. 27a is a perspective view of a twist float, in accordance with another embodiment of the present invention.
Figures 27B, 27C, 28:
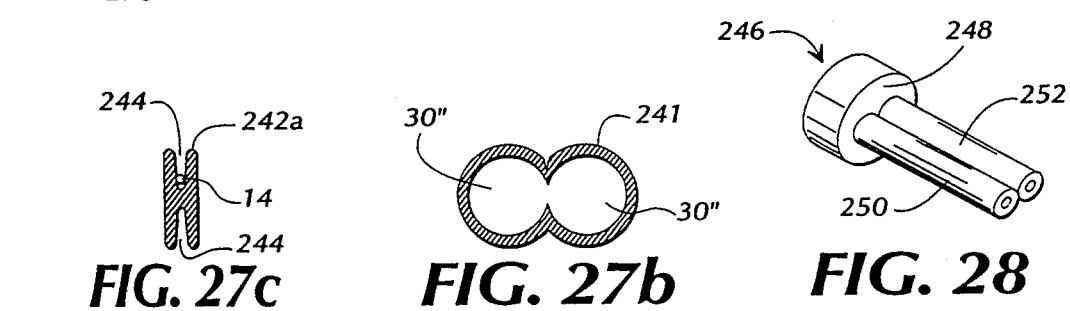
Figures 29A, 29B, 29C:
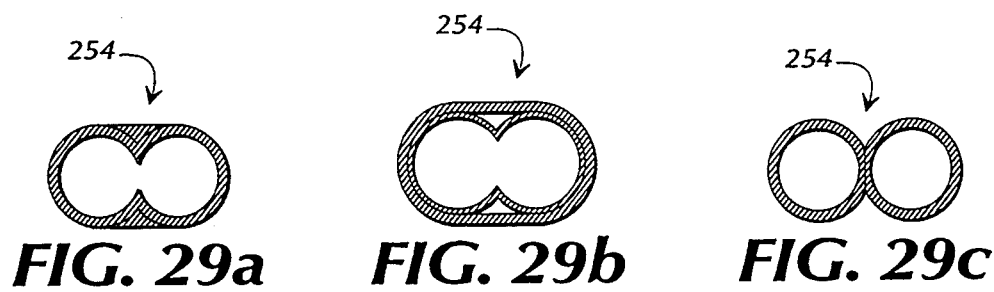
FIGS. 29a–29f show axial, cross-sectional views of tubes from which alternate twist floats can be manufactured, in accordance with other embodiments of the present invention.
Figures 29D, 29E, 29F:
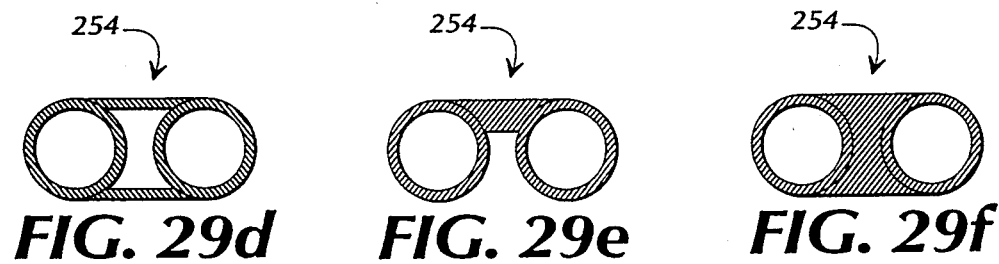

FIG. 27a is a perspective view of a twist float 240, in accordance with another embodiment of the present invention, which includes a tubular center section 241 and twisted ends 242a,b. The twisted ends 242a,b define grooves 244 that fishing line 14 is wedged into such that the twist float 240 functions as a quick-snap float, as would be understood by those reasonably skilled in the art in light of this disclosure. FIG. 27b is a cross-sectional view of the twist float 240 taken along line 27b—27b of FIG. 27a, wherein the twisted end section 242b is cut-away to more clearly show the tubular center section 241. Referring also to FIG. 27c, which is a cross-sectional view of the twist float 240 taken along line 27c—27c of FIG. 27a, the twisted ends 242a,b seal the tubular center section 241 to form an air-tight interior cavity 30" which provides buoyancy.

Twist floats 240 are constructed, in accordance with one method of the present invention, from a tube that is extruded in a conventional manner from the materials described above, and has an axial cross-sectional view that is identical to the view of FIG. 27b. FIG. 28 is a perspective view of a twist tool 246 for fabricating twist floats 240 from an extruded tube. The twist tool 246 includes a base 248, a first barrel 250, and second barrel 252, wherein both barrels 250,252 extend from the base 248. A twist float 240 is fabricated from an appropriate section of extruded tube (described above) by mating a twist tool 246 to each end of the tube such that the barrels 250,252 are inserted into the tube. Then, a limited amount of hot plastic or, more particularly, polypropylene or polyethylene is injected into the ends of the tube through the barrels 250,252 such that the float interior cavity 30" (FIG. 27b) is not filled with the material, and the twist tools 246 are then rotated and withdrawn from the tube to form the twisted ends 242a,b. The middle portion of the tube is secured during the process so that it does not twist or collapse. According to another method, the entire length of the tube is twisted to form a float that is twisted from one end to the other. Also, differently configured tools and tubes are used, in accordance with other methods, to construct floats that are similar to the twist float 240 shown in FIGS. 27a–c. For example, FIGS. 29a–f show axial, cross-sectional views of acceptable tubes 254.

FIG. 30a is a side, cut-away view of an alternate twisted end section 242b', in which an alternate groove 244' is formed on only one side of the twisted end section 242b', in accordance with another embodiment of the present invention. FIG. 30b is a cross-sectional view of the alternate twisted end section 242b', taken along line 30b—30b of FIG. 30a. Fishing line 14 is wedged into the alternate groove 244' where it is selectively retained by friction. FIG. 31a, shows an axial, cross-sectional view of a notched tube 256, which defines a notch 258, from which, it is thought, a twisted end section 242b' is fabricated. FIG. 31b shows an axial, cross-sectional view of toothed twister 260 that defines an axial cavity 262 into which a tooth 264 protrudes.

An alternate twisted end section 242b' is formed by axially inserting the notched tube 256 into the toothed twister 260 as shown in FIG. 31c, which is a perspective, cut-away view of the notched tube 256 axially inserted into the toothed twister 260. FIG. 31d is a cross-sectional view of the notched tube 256 axially inserted into the toothed twister 260, taken along line 31d—31d of FIG. 31c. Then, a limited amount of hot plastic, or other material suitable for sealing the end of the notched tube 256, is injected into the end of the notched tube 256, and the toothed twister 260 is rotated while being slid off of the notched tube 256, such that the notched tube 256 is transformed into a twisted end section 242b' with an alternate groove 244'. In another alternate embodiment, the entire length of the notched tube 256 is, in theory, twisted to form a float that is twisted from one end to the other.

Figure 32A:
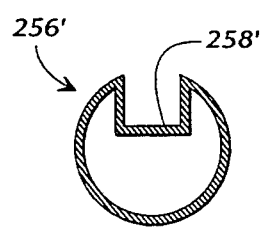
FIG. 32a is an axial, cross-sectional view of another notched tube, in accordance with another embodiment of the present invention.
Figure 32B:
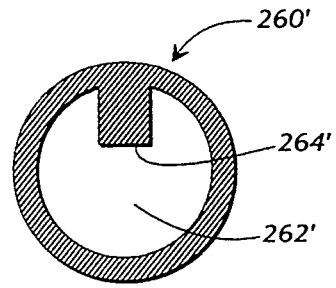
FIG. 32b is an axial, cross-sectional view of another toothed twister, in accordance with another embodiment of the present invention.

FIG. 32a, shows an axial, cross-sectional view of an alternate notched tube 256', which defines an alternate notch 258', and FIG. 32b shows an axial, cross-sectional view of an alternate toothed twister 260' that defines an axial cavity 262' into which an alternate tooth 264' protrudes. It is thought that an end section similar to the alternate twisted end section 242b' (FIG. 30a) is formable from the alternate notched tube 256' and alternate toothed twister 260' in the manner described above.

Figure 33A:
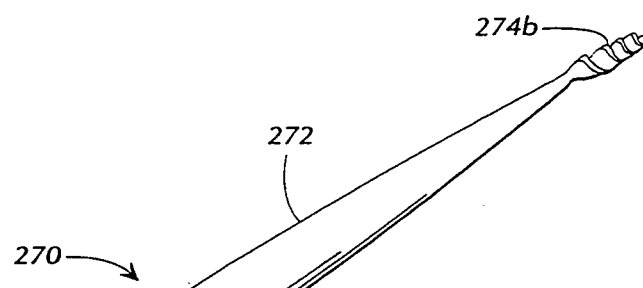
FIG. 33a is a perspective view of a tapered tubular float, in accordance with another embodiment of the present invention.
Figure 33C:
FIG. 33c is a cross-sectional view of the tapered tubular float taken along line 33c—33c of FIG. 33b.
Figure 33B:
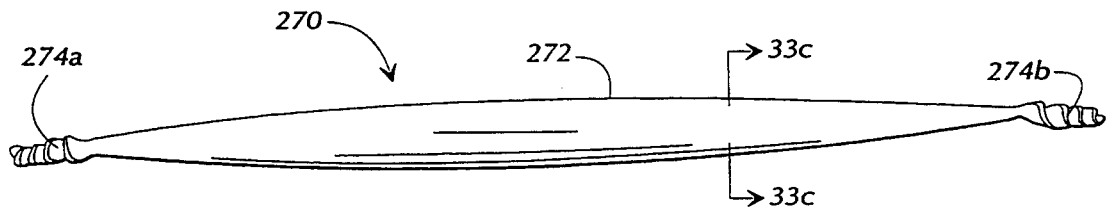
FIG. 33b is a side view of the tapered tubular float.

FIG. 33a is a perspective view of a tapered tubular float 270, and FIG. 33b is a side view of the tapered tubular float 270, in accordance with another embodiment of the present invention. The tapered tubular float 270 includes a tapered center section 272 bound by spiral ends 274a,b. FIG. 33c is a cross-sectional view of the tapered tubular float 270 taken along line 33c—33c of FIG. 33b and shows an interior cavity 30'''. The spiral ends 274a,b bound the tapered center section 272 to form the interior cavity 30''' which is air-tight and provides buoyancy. In accordance with other embodiments of the present invention, the tapered center section 272 is baffled. The tapered tubular float 270 is used by wrapping a piece of fishing line 14 (FIG. 1a) around the spiral ends 274a,b and center section 272, as would be understood by one reasonably skilled in the art upon reviewing the above disclosure.

Referring to FIGS. 33a-c, a tapered tubular float 270 is fabricated, for example, from a tube extruded in accordance with other embodiments of the present invention, as described above. Both non-baffled and baffled tubes are suitable. A die (not shown), that when closed defines a cavity shaped to appropriately mold the tapered center section 272 is closed around the mid-portion of the tube while the tube is heated and being pulled at the ends. A release agent such as, for example, lanolin is applied to the ends of the tube to facilitate the formation of the spiral ends 274a,b. The ends of the tube are then grasped with a clip member (not shown) that, for example, could resemble a clothes-pin, and twisted to form the spiral ends 274a,b. The resulting tapered tubular float 270 is then allowed to cool and removed from the die. Alternately, hot air is blown into the tube while it is within the die to cause it to conform to the shape of the die. Subsequently cold air would be blown into the tube and the spiral ends 274a,b would be formed in the manner discussed above, while the ends of the tube are heated.

Figure 34:
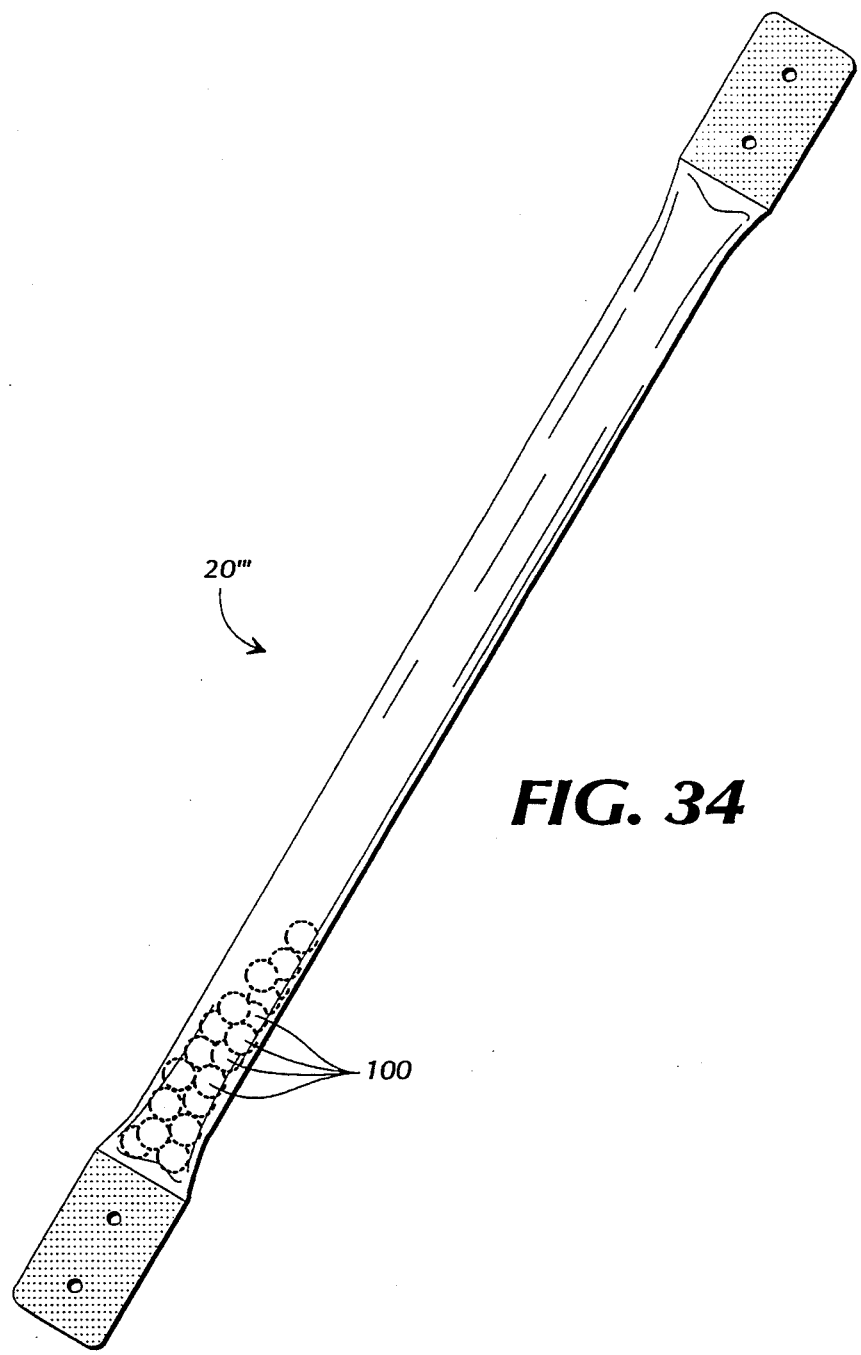
FIG. 34 is a perspective view of a weighted tubular fishing float, with pellets disposed therein, in accordance with another embodiment of the present invention.
Figure 35A:
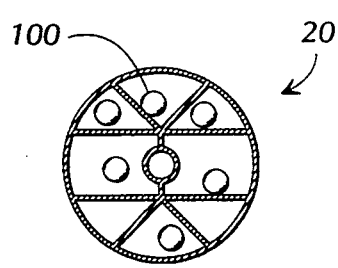
FIGS. 35a–35l are cross-sectional, cut-away, axial, schematic views of baffled tubular fishing floats, with pellets disposed therein, in accordance with other embodiments of the present invention.
Figure 35B:
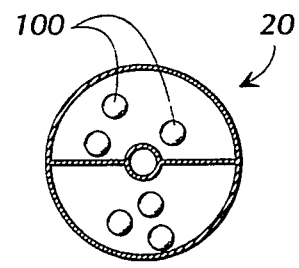
Figure 35C:
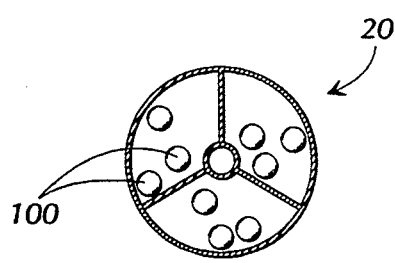
Figure 35D:
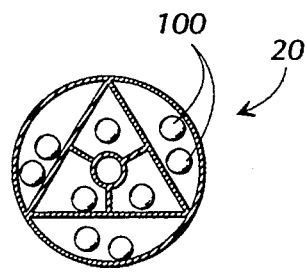
Figure 35E:
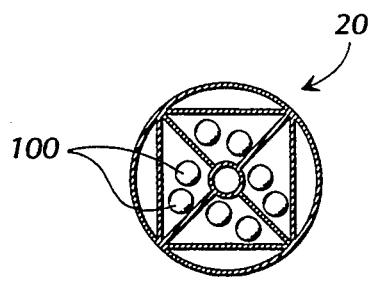
Figure 35F:
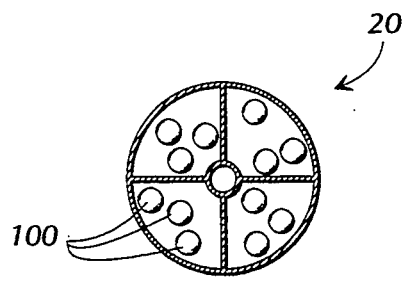
Figure 35G:
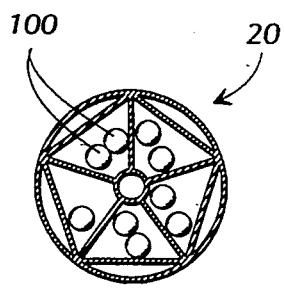
Figure 35H:
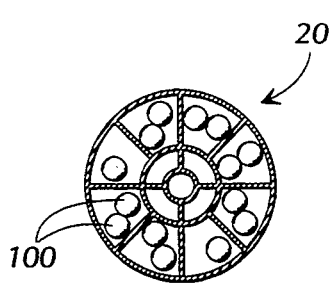
Figure 35I:
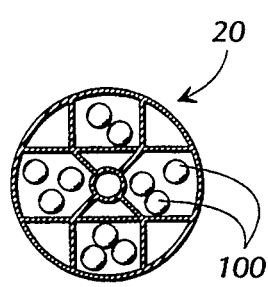
Figure 35J:
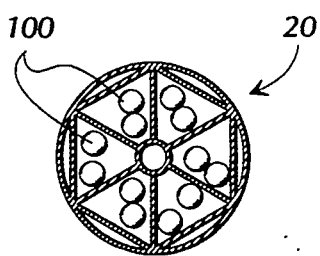
Figure 35K:
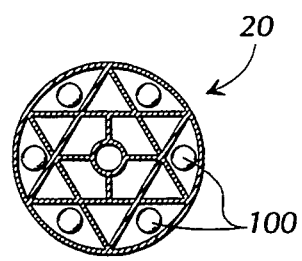
Figure 35L:
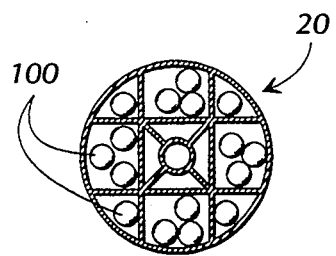

FIG. 34 is a perspective view of a weighted tubular fishing float 20''', in accordance with another embodiment of the present invention. As shown in FIG. 34, the weighted tubular fishing float 20''' is similar to a fishing float 20 with end sections 24a,b, (FIG. 1a), and has a plurality of pellets 100 (shown in broken lines) disposed within the float interior cavity 30 (FIG. 2a) (only a representative few of the pellets 100 are specifically pointed out for simplicity). The plurality of pellets 100 are placed within float interior cavity 30 during fabrication. Examples of acceptable pellets 100 are plastic beads, standard BBs, or steel bird-shot. The number of pellets 100 within a weighted tubular fishing float 20''' is selectively determined based upon considerations of the advantages of increased weight and noise (discussed below) and decreased buoyancy.

A weighted tubular fishing float 20''' functions in a manner similar to the functioning of the tubular fishing float 20 with end sections 12a,b, (FIG. 1a). During operation, the greater weight of the weighted tubular fishing float 20''' enhances certain casting characteristics. Also, the plurality of pellets 100 tend to collect in one end of the weighted tubular fishing float 20'''. This tends to cause one end of the float 20''' to extend upward from the water making it more visible. Also, a fisherman can jiggle, snap or twitch his fishing line 14 to shake the plurality of pellets 100 from one end of the weighted tubular fishing float 20''' to the other. The shape of the weighted tubular fishing float 20''' will tend to cause the float 20''' to cooperate with the fisherman's efforts due to the fact that the pellets 100 can roll from one end of the weighted tubular fishing float 20''' to the other. The movement of the plurality of pellets 100 generates a sound that is thought to attract fish, including bream fish, who may, for example, confuse the sound for that of a wounded cricket.

In accordance with other embodiments of the present invention, the pellets 100 are magnetized. It is thought that the magnetization of the pellets 100 will increase the movement of the pellets 100 and thus the noise they generate. Once set into motion, for example, due to the fisherman twitching the fishing line 14 (FIG. 1a), it is thought that the magnetized pellets 100 will remain in motion until their magnetic poles are properly aligned. In accordance with other embodiments of the present invention, pellets 100 are disposed within each of the floats disclosed above and used in a manner similar to that described above. For example, cross-sectional, cut-away, axial, schematic views of baffled tubular fishing floats 20', with pellets 100 disposed therein, are shown in FIGS. 35a-l (only a representative few of the pellets 100 are specifically pointed out for simplicity).

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A tubular fishing float for attachment to a fishing line, said tubular fishing float comprising:
   a tube wall;
   a first end section;
   a second end section, wherein said tube wall, said first end section, and said second end section bound a float interior cavity that is air-tight; and
   a baffle wall defining a baffle compartment that extends through said float interior cavity and is in communication with the environment exterior to said tubular fishing float at said first end section and said second end section.

2. The tubular fishing float of claim 1, wherein said tube wall defines a slot extending between said first end section and said second end section, wherein said slot is in communication with the environment exterior to said tubular fishing float.

3. The tubular fishing float of claim 1, wherein said tubular fishing float defines crevice that is capable of being selectively opened to provide a communication path between said baffle compartment and the environment exterior to said tubular fishing float, wherein said tubular fishing float is resilient such that said crevice is biased toward a closed configuration.

4. The tubular fishing float of claim 1, wherein said baffle wall protrudes from said first end section and said second end section such that said baffle compartment extends beyond said first end section and said second end section.

5. The tubular fishing float of claim 1, further comprising a rod disposed within and extending from said baffle compartment at said first end section and said second end section.

6. The tubular fishing float of claim 5, wherein said rod defines a groove means for attaching the fishing line, wherein said groove means spirals around said rod.

7. A tubular fishing float for attachment to a fishing line, said tubular fishing float comprising:
- a center tube section;
- a first end section;
- a second end section, wherein said first end section and said second end section enclose said center tube section to define a float interior cavity within said center tube section, and wherein said first end section, said second end section, and said center tube section are constructed from a single continuous piece of material, whereby said tubular fishing float is unitary;
- posts protruding from said first end section and said second end section; and
- groove means for attaching the fishing line, wherein said groove means spans said center tube section and said end sections, and spirals around said posts.

8. A tubular fishing float for attachment to a fishing line, said tubular fishing float comprising:
- a center tube section;
- a first end section; and
- a second end section,
- wherein said first end section and said second end section enclose said center tube section to define a float interior cavity within said center tube section, and wherein said first end section, said second end section, and said center tube section are constructed from a single continuous piece of material, whereby said tubular fishing float is unitary,
- wherein said center tube section, said first end section, and said second end section define a central axis therethrough and a longitudinal slot means for placing the fishing line in close proximity to said central axis, and
- wherein said tubular fishing float further comprises posts extending from said first end section and said second end section, wherein each of said posts define a groove means that spirals around said post for attaching to the fishing line.

9. A tubular fishing float for attachment to a fishing line, said tubular fishing float comprising:
- a center tube section;
- a first end section; and
- a second end section,
- wherein said first end section and said second end section enclose said center tube section to define a float interior cavity within said center tube section, and wherein said first end section, said second end section, and said center tube section are constructed from a single continuous piece of material, whereby said tubular fishing float is unitary, and
- wherein each of said first end section and said second end section include, at least,
  - a first fold, and
  - a second fold overlapping said first fold.

10. A tubular fishing float for attachment to a fishing line, said tubular fishing float comprising:
- a baffled center tube section;
- a first end section; and
- a second end section,
- wherein said first end section and said second end section enclose said center tube section to define a float interior cavity within said center tube section, and wherein said first end section, said second end section, and said center tube section are constructed from a single continuous piece of material, whereby said tubular fishing float is unitary.

11. A tubular fishing float for attachment to a fishing line, said tubular fishing float comprising:
- a center tube section;
- a first end section; and
- a second end section,
- wherein said first end section and said second end section enclose said center tube section to define a float interior cavity within said center tube section, and wherein said first end section, said second end section, and said center tube section are constructed from a single continuous piece of material, whereby said tubular fishing float is unitary, and
- wherein said center tube section includes, at least,
  - a tube wall bounding said float interior cavity, and
  - baffle walls extending from said tube wall and passing through said float interior cavity and defining baffle compartments.

12. A tubular fishing float for attachment to a fishing line, said tubular fishing float comprising:
- a center tube section;
- a first end section; and
- a second end section,
- wherein said first end section and said second end section enclose said center tube section to define a float interior cavity within said center tube section, and wherein said first end section, said second end section, and said center tube section are constructed from a single continuous piece of material, whereby said tubular fishing float is unitary,
- wherein each of said first end section and said second end section include attachment means for attaching to the fishing line, including attachment holes defined through said first end section and said second end section, and
- wherein said end sections further define funnel-shaped indentures having an apex at each of said attachment holes.

* * * * *